United States Patent
Jin et al.

(10) Patent No.: US 11,902,457 B2
(45) Date of Patent: Feb. 13, 2024

(54) ELECTRONIC DEVICE INCLUDING FLEXIBLE DISPLAY AND METHOD OF CONTROLLING THE SAME

(71) Applicant: SAMSUNG ELECTRONICS CO., LTD., Suwon-si (KR)

(72) Inventors: Jaeyoung Jin, Suwon-si (KR); Yelim Kim, Suwon-si (KR); Hyeondeok Kim, Suwon-si (KR); Wonsub Lee, Suwon-si (KR); Joonwon Cho, Suwon-si (KR); Woong Han, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/900,873

(22) Filed: Sep. 1, 2022

(65) Prior Publication Data

US 2023/0085568 A1    Mar. 16, 2023

Related U.S. Application Data

(63) Continuation of application No. PCT/KR2022/011228, filed on Jul. 29, 2022.

(30) Foreign Application Priority Data

Sep. 16, 2021 (KR) .......................... 10-2021-0124340

(51) Int. Cl.
*H04M 1/02* (2006.01)

(52) U.S. Cl.
CPC ....... *H04M 1/0268* (2013.01); *H04M 1/0214* (2013.01)

(58) Field of Classification Search
CPC .......................... H04M 1/0268; H04M 1/0214
See application file for complete search history.

(56) References Cited

U.S. PATENT DOCUMENTS 7,876,867 B2   1/2011  Filipovic et al.
11,147,026 B2  10/2021 Lee et al.
(Continued)

FOREIGN PATENT DOCUMENTS

CN   110113459 A    8/2019
KR   10-1070573 B1  10/2011
(Continued)

OTHER PUBLICATIONS

International Search Report dated Nov. 22, 2022 for PCT/KR2022/011228.

*Primary Examiner* — Lewis G West
(74) *Attorney, Agent, or Firm* — CANTOR COLBURN LLP

(57) ABSTRACT

An electronic device includes a housing structure including a plurality of antennas; a hinge; a first housing connected to the hinge and including a first surface and a second surface opposite to the first surface; and a second housing connected to the hinge and including a third surface and a fourth surface opposite to the third surface, a sensor module; and a processor operatively connected to the sensor module. The processor detects an unfolding operation or a folding operation between the first housing and the second housing using the sensor module, generate folding information on the unfolding operation or the folding operation based on a folding angle formed between the first housing and the second housing, when the unfolding operation or the folding operation is detected, and control an output of at least one antenna based on the folding information.

6 Claims, 18 Drawing Sheets

(56) References Cited

U.S. PATENT DOCUMENTS

| | | |
|---|---|---|
| 11,158,929 B2 | 10/2021 | Shi et al. |
| 11,315,445 B2 | 4/2022 | Li et al. |
| 2001/0048413 A1* | 12/2001 | Tabata ................. H04M 1/0214 345/87 |
| 2003/0092470 A1* | 5/2003 | Kurakane ............. G06F 3/0426 455/566 |
| 2006/0097048 A1* | 5/2006 | Mori ...................... H01Q 1/242 235/439 |
| 2006/0118625 A1 | 6/2006 | Sekita |
| 2010/0073066 A1* | 3/2010 | Seshita ................ H03K 17/693 327/427 |
| 2010/0231458 A1* | 9/2010 | Koyama ................ H01Q 21/28 343/702 |
| 2018/0088633 A1* | 3/2018 | Whitman ............. G06F 1/1677 |
| 2018/0131501 A1* | 5/2018 | Little ................... H04B 1/0064 |
| 2019/0103656 A1* | 4/2019 | Shi ........................ G06F 1/1683 |
| 2020/0195336 A1 | 6/2020 | Raghavan et al. |
| 2020/0225706 A1* | 7/2020 | Jung ................. H04M 1/72427 |
| 2020/0233461 A1* | 7/2020 | Kim ....................... G06F 1/1641 |
| 2020/0350939 A1* | 11/2020 | Lee ......................... H01Q 9/42 |
| 2021/0089686 A1* | 3/2021 | He ......................... G06F 1/1641 |
| 2021/0104582 A1 | 4/2021 | Kim et al. |
| 2021/0306396 A1* | 9/2021 | Kye ................. H04L 65/4061 |
| 2021/0342044 A1* | 11/2021 | Xu ....................... G06F 3/0486 |
| 2022/0057866 A1* | 2/2022 | Xu ....................... H04N 23/632 |
| 2022/0058461 A1* | 2/2022 | Sugimura ............ H01Q 1/2208 |
| 2022/0061175 A1 | 2/2022 | Oh et al. |
| 2023/0044497 A1* | 2/2023 | Zhang .................. G06F 3/0482 |

FOREIGN PATENT DOCUMENTS

| | | |
|---|---|---|
| KR | 10-2020-0041970 A | 4/2020 |
| KR | 20200072190 A | 6/2020 |
| KR | 10-2020-0121199 A | 10/2020 |
| KR | 20200120134 A | 10/2020 |
| KR | 10-2021-0010294 A | 1/2021 |
| KR | 10-2021-0041156 A | 4/2021 |

* cited by examiner

ELECTRONIC DEVICE INCLUDING FLEXIBLE DISPLAY AND METHOD OF CONTROLLING THE SAME

TECHNICAL FIELD

This document relates to an electronic device, and more particularly, to an electronic device (e.g., foldable device, rollable device), for example, including an antenna and a flexible display, and a method of controlling the same.

BACKGROUND ART

With the development of wireless communication technology, electronic devices (e.g., communication electronic devices) are commonly used in daily life; thus, the use of contents is increasing exponentially. Because of such rapid increase in the use of contents, a network capacity is gradually reaching a limit thereof, and after commercialization of a 4th generation (4G) communication system, in order to meet growing wireless data traffic demand, a communication system (e.g., 5th generation (5G) or pre-5G communication system, or new radio (NR))) that transmits and/or receives signals using a frequency of a high frequency band (e.g., mmWave, about 3 GHz to 300 GHz band) is being studied.

Further, electronic devices are gradually being transformed into various shapes, away from a uniform rectangular shape. For example, the electronic device may have a transformable structure capable of using a large screen display when used while being convenient to carry. As a kind of such electronic devices, a foldable type or rollable type electronic device has been released.

In relation to an electronic device having a transformable structure such as a foldable type or rollable type electronic device, interest in a method of controlling an antenna corresponding to a new structure of the electronic device is increasing.

DISCLOSURE OF INVENTION

Technical Problem

When a plurality of transmission antennas are used, 3rd inter-modulation distortion ("IMD3") may occur according to a combination thereof. IMD3 may be understood as noise that interferes an original signal by outputting a combined frequency as the sum and difference of different frequencies when two or more different input frequency signals are to be processed. When IMD3 is formed close to an original input frequency; thus, it may be difficult to filter IMD3.

For example, in a foldable device, a physical distance between two antennas may vary according to a folding angle of a terminal, and as the terminal is folded, the physical distance between the two antennas becomes closer; thus, IMD3 may become larger.

Further, in a rollable or slidable device, the physical distance between the two antennas may vary according to the extent to which the display is expanded, and as the display is reduced, the physical distance between the two antennas becomes closer; thus, IMD3 may become larger.

Solution to Problem

In an electronic device according to various embodiments of this document, a method of reducing the decrease in a performance of an antenna according to an angle of a folder of the electronic device may be provided.

Further, a method of improving a performance of an antenna by adjusting an output of the antenna based on a distance between antennas on an electronic device may be provided.

According to various embodiments, an electronic device includes a housing structure, a sensor module; and a processor operatively connected to the sensor module. The housing structure includes a plurality of antennas; a hinge; a first housing connected to the hinge and including a first surface and a second surface disposed opposite to the first surface; and a second housing connected to the hinge and including a third surface and a fourth surface disposed opposite to the third surface. In a folded state, the first surface faces the third surface, and in an unfolded state, the first surface and the third surface face in the same direction. The processor detects an unfolding operation or a folding operation between the first housing and the second housing using the sensor module, generates folding information on the unfolding operation or the folding operation based on a folding angle formed between the first housing and the second housing, when the unfolding operation or the folding operation is detected, and controls an output of at least one antenna based on the folding information.

According to various embodiments, a method of controlling an antenna output of an electronic device includes detecting an unfolding operation or a folding operation between a first housing and a second housing; generating folding information on the unfolding operation or the folding operation based on a folding angle formed between the first housing and the second housing when the unfolding operation or the folding operation is detected; measuring a distance between the plurality of antennas; and controlling an output of at least one antenna of the plurality of antennas based on the folding information or based on the distance between the plurality of antennas.

Advantageous Effects of Invention

According to various embodiments, by configuring a power back off value of an antenna according to an angle of a folder, it is possible to effectively minimize the decrease in a performance of the antenna due to IMD3 while minimizing the decrease in power.

According to various embodiments, when the electronic device is closed or transmission power corresponds to a weak electric field in which it is less than a predetermined level, power of one of the two antennas is turned off to effectively minimize a decrease in a performance of the antenna due to IMD3.

MODE FOR THE INVENTION

Figure 1:
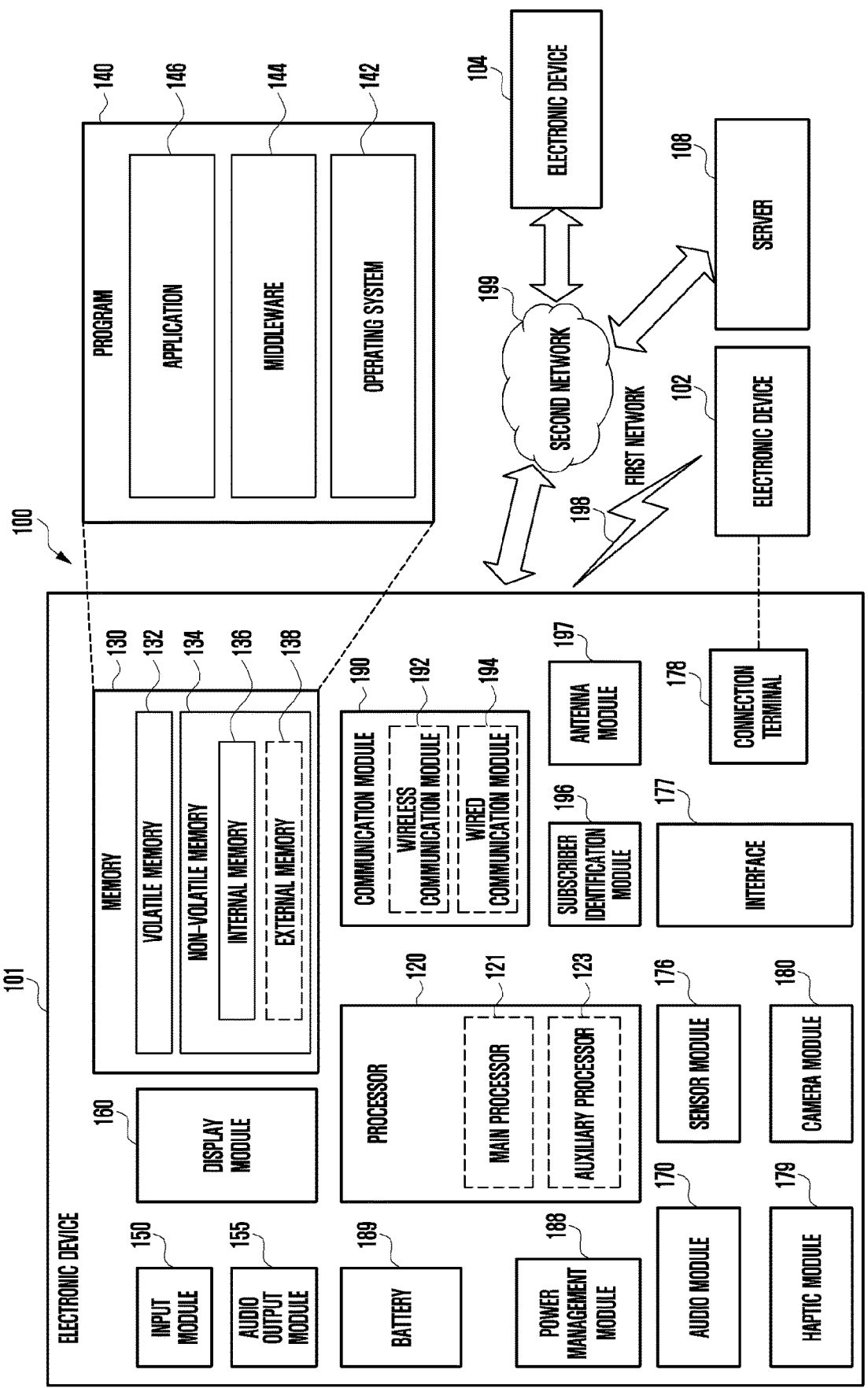
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), mass n chine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit r receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave hand), and a plurality of antennas (e.g., array antennas) disposed on a second surface e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition t executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
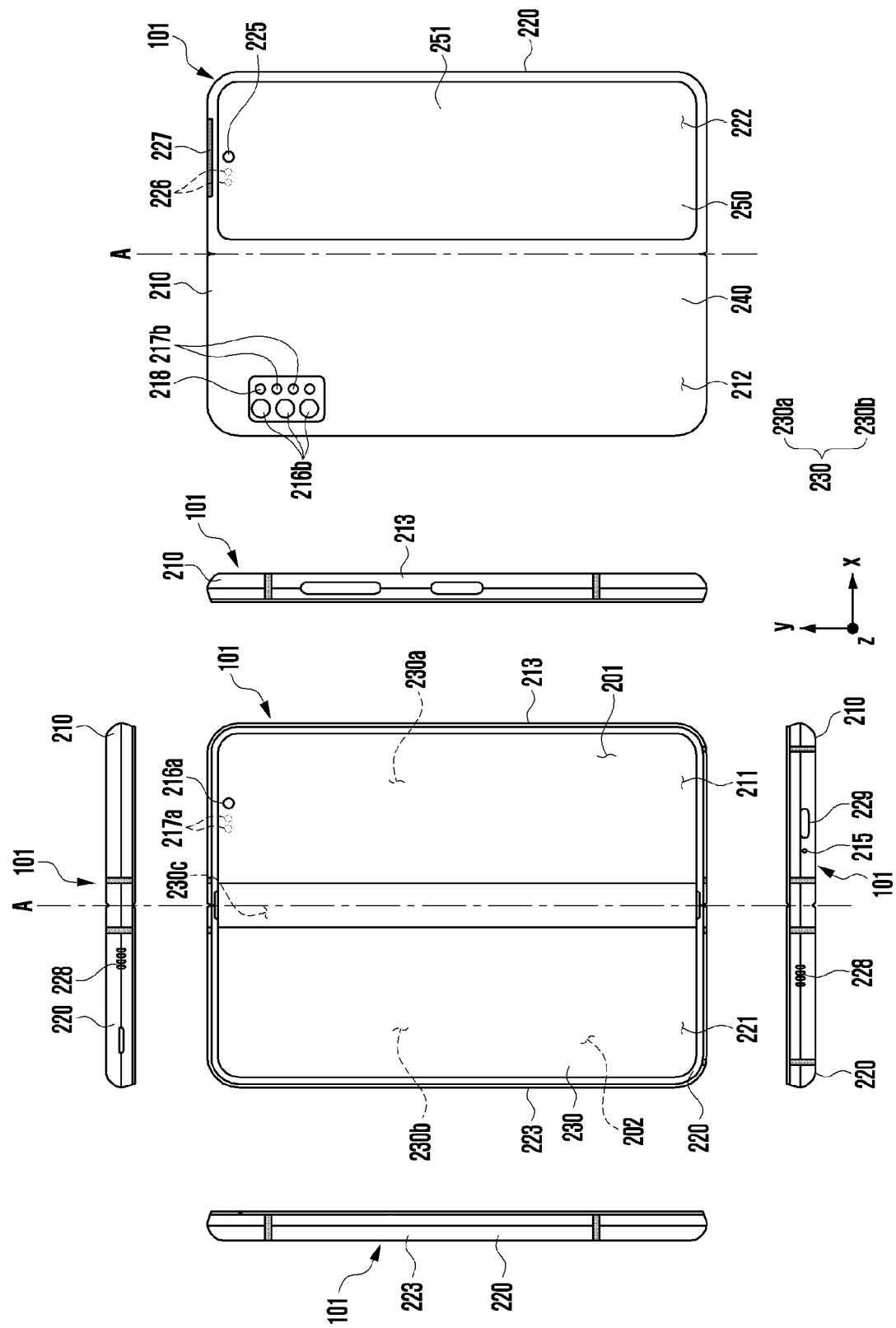
FIG. 2A is a diagram illustrating an unfolded state of an electronic device according to various embodiments of the disclosure.
Figure 2B:
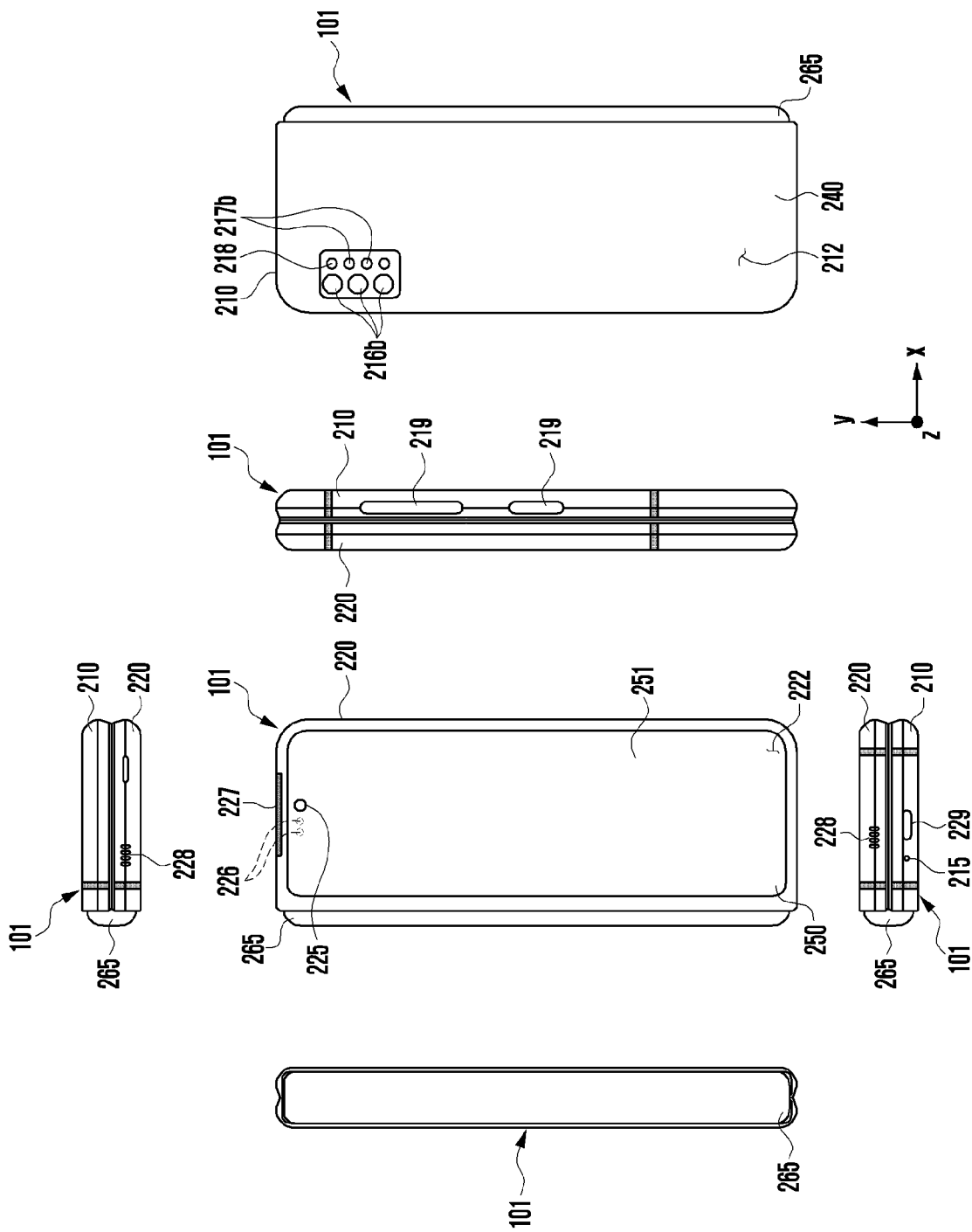
FIG. 2B is a diagram illustrating a folded state (e.g., second state) of an electronic device according to various embodiments of the disclosure.

FIG. 2A is a diagram illustrating an unfolded state (e.g., first state) of the electronic device 101 according to various embodiments of the disclosure. FIG. 2B is a diagram illustrating a folded state (e.g., second state) of the electronic device 101 of FIG. 2A according to various embodiments of the disclosure.

With reference to FIGS. 2A and 2B, the electronic device 101 may include a pair of housings 210 and 220 (e.g., foldable housing) rotatably coupled on a folding axis A through a hinge device so as to be folded with respect to each other, a first display 230 (e.g., flexible display, foldable display, or main display) disposed through the pair of housings 210 and 220, and a second display 251 (e.g., sub-display) disposed on a surface of the electronic device 101 opposite to a surface on which the first display 230 is disposed. According to an embodiment, the hinge device may be disposed to be invisible from the outside by the first housing 210 and the second housing 220 in a folded state and be disposed to be invisible from the outside by a hinge cover 265 for protecting the hinge device and covering a foldable part in an unfolded state. In this document, the surface on which the first display 230 is disposed may be defined as a front surface of the electronic device 101, and the opposite surface of the front surface may be defined as a rear surface of the electronic device 101. Further, a surface enclosing a space between the front surface and the rear surface may be defined as a side surface of the electronic device 101.

According to various embodiments, the pair of housings 210 and 220 may include a first housing 210 and a second housing 220 disposed to be foldable with respect to each other through the hinge device. According to an embodiment, the pair of housings 210 and 220 are not limited to a shape and combination illustrated in FIGS. 2A and 2B, and may be implemented by a combination and/or coupling of other shapes or parts. According to an embodiment, the first housing 210 and the second housing 220 may be disposed at opposite sides about a folding axis A and have an overall symmetrical shape with respect to the folding axis A. According to some embodiments, the first housing 210 and the second housing 220 may be folded asymmetrically with respect to the folding axis A. According to an embodiment, the first housing 210 and the second housing 220 may have different angles or distances formed from each other according a state of the electronic device 101 (e.g., an unfolded state (in other words, first state), a folded state (in other words, second state), or an intermediate state (in other words, third state)).

According to an embodiment, a first antenna 201 may be disposed in a portion of the first housing 210. Further, a second antenna 202 may be disposed in a portion of the second housing 220. According to an embodiment, the first antenna 201 and the second antenna 202 may have different angles or distances formed from each other according to whether the electronic device 101 is in an unfolded state (e.g., first state), a folded state (e.g., second state an intermediate state (e.g., third state).

According to various embodiments, the first housing 210 may include a first surface 211 connected to the hinge device and disposed to face the front of the electronic device 101 in an unfolded state of the electronic device 101, a second surface 212 opposite to the first surface 211, and a first side member 213 enclosing at least a portion of a first space between the first surface 211 and the second surface 212. According to an embodiment, the second housing 220 may include a third surface 221 connected to the hinge device and disposed to face the front of the electronic device 101 in the unfolded state of the electronic device 101, a fourth surface 222 opposite to the third surface 221, and a second side member 223 enclosing at least a portion of a second space between the third surface 221 and the fourth surface 222. According to an embodiment, the first surface 211 may face in the same direction as the third surface 221 in the unfolded state and face the third surface 221 in the folded state.

According to various embodiments, the hinge cover 265 may be disposed between the first housing 210 and the second housing 220 to cover the hinge device. According to an embodiment, the hinge cover 265 may be covered or exposed to the outside by a part of the first housing 210 and the second housing 220 according to the unfolded state, the folded state, or the intermediate state of the electronic device 101. For example, when the electronic device 101 is in an unfolded state, the hinge cover 265 may not be exposed because it is covered by the first housing 210 and the second housing 220. According to an embodiment, when the electronic device 101 is in a folded state, the hinge cover 265 may be exposed to the outside between the first housing 210 and the second housing 220. According to an embodiment, when the first housing 210 and the second housing 220 are in an intermediate state in which the electronic device 101 is folded with a certain angle, the hinge cover 265 may be at least partially exposed to the outside of the electronic device 101 between the first housing 210 and the second housing 220. For example, an area in which the hinge cover 265 is exposed to the outside in the intermediate state may be smaller than an area in which the hinge cover 265 is exposed to the outside in a fully folded state. According to an embodiment, the hinge cover 265 may include a curved surface.

According to various embodiments, when the electronic device 101 is in an unfolded state (e.g., the state of FIG. 2A), the first housing 210 and the second housing 220 may form an angle of 180 degrees (°), and a first area 230a, a folding area 230c, and a second area 230b of the first display 230 may form the same plane and be disposed to face in the same direction. In another embodiment, when the electronic device 101 is in an unfolded state, the first housing 210 may rotate at an angle of 360 degrees with respect to the second housing 220 to be folded oppositely so that the second surface 212 and the fourth surface 222 face (out-folding method).

According to various embodiments, when the electronic device 101 is in a folded state (e.g., the state of FIG. 2B), the first surface 211 of the first housing 210 and the third surface 221 of the second housing 220 may be disposed to face each other. In this case, the first area 230a and the second area 230b of the first display 230 may form a narrow angle (e.g., a range of 0 to 10 degrees) with each other through the folding area 230c and be disposed to face each other. According to an embodiment, at least a portion of the folding area 230c may be formed in a curved surface having a predetermined radius of curvature. According to an embodiment, when the electronic device 101 is in an intermediate state, the first housing 210 and the second housing 220 may be disposed at a certain angle to each other. In this case, the first area 230a and the second area 230b of the first display 230 may form an angle larger than the folded state and smaller than the unfolded state, and the radius of curvature of the folding area 230c may be larger than that of the folded state. In some embodiments, the first housing 210 and the second housing 220 may forth an angle that may stop at a specified folding angle between the folded state and the unfolded state through the hinge device (free stop function). In some embodiments, the first housing 210 and the second housing 220 may operate while being pressed in an unfolding or folding direction based on a designated inflection angle through the hinge device.

According to various embodiments, the electronic device 101 may include at least one of at least one display 230 and 251, an input device 215, sound output devices 227 and 228, sensor modules 217a, 217b, and 226, camera modules 216a, 216b, and 225, a key input device 219, an indicator (not illustrated), or a connector port 229 disposed in the first housing 210 and/or the second housing 220. In some embodiments, the electronic device 101 may omit at least one of the components or may additionally include at least one other component.

According to various embodiments, the at least one display 230 and 251 may include a first display 230 (e.g., flexible display) disposed to receive the support of the third surface 221 of the second housing 220 from the first surface 211 of the first housing 210 through the hinge device and a second display 251 disposed to be visible from the outside through the fourth surface 222 in an inner space of the second housing 220. According to an embodiment, the first display 230 may be mainly used in an unfolded state of the electronic device 101, and the second display 251 may be mainly used in a folded state of the electronic device 101. According to an embodiment, in an intermediate state, the electronic device 101 may use the first display 230 or the second display 251 based on a folding angle of the first housing 210 and the second housing 220.

According to various embodiments, the first display 230 may be disposed in a space formed by a pair of housings 210 and 220. According to an embodiment, the first display 230 may include a flexible display in which at least a partial area may be transformed into a flat surface or a curved surface. According to an embodiment, the first display 230 may include a first area 230a facing the first housing 210, a second area 230b facing the second housing 220, and a folding area 230c connecting the first area 230a and the second area 230b and facing the hinge device.

According to an embodiment, the first area 230a of the first display 230 may substantially form the first surface 211 of the first housing 210. According to an embodiment, the second area 230b of the first display 230 may substantially form the third surface 221 of the second housing 220.

According to an embodiment, area division of the first display 230 is merely exemplary physical division by the pair of housings 210 and 220 and the hinge device, and the first display 230 may be displayed in a seamless one full screen through substantially the pair of housings 210 and 220 and the hinge device. According to an embodiment, the first area 230a and the second area 230b may have an overall symmetrical shape or a partially asymmetrical shape based on the folding area 230c.

According to various embodiments, the electronic device 101 may include a first rear cover 240 disposed at the second surface 212 of the first housing 210 and a second rear cover 250 disposed at the fourth surface 222 of the second housing 220. In some embodiments, at least a portion of the first rear cover 240 may be integrally formed with the first side member 213. In some embodiments, at least a portion of the second rear cover 250 may be integrally formed with a second side member 223. According to an embodiment, at least one cover of the first rear cover 240 and the second rear cover 250 may be formed through a substantially transparent plate (e.g., a polymer plate or a glass plate including various coating layers) or an opaque plate. According to an embodiment, the first rear cover 240 may be formed by, for example, coated or tinted glass, ceramic, polymer, metal (e.g., aluminum, stainless steel (STS), or magnesium), or an opaque plate such as a combination of at least two of the above materials. According to an embodiment, the second rear cover 250 may be formed through, for example, a substantially transparent plate such as glass or polymer. Accordingly, the second display 251 may be disposed to be visible from the outside through the second rear cover 250 in an inner space of the second housing 220.

According to various embodiments, the input device 215 may include a microphone 215. In some embodiments, the input device 215 may include a plurality of microphones 215 disposed to detect a direction of a sound. According to an embodiment, the sound output devices 227 and 228 may include speakers 227 and 228. According to an embodiment, the speakers 227 and 228 may include a call receiver 227 disposed through the fourth surface 222 of the second housing 220 and an external speaker 228 disposed through a side member of the second housing 220. In some embodiments, the microphone 215, the speakers 227 and 228, and the connector port 229 may be disposed in spaces of the first housing 210 and/or the second housing 220 and be exposed to an external environment through at least one hole formed in the first housing 210 and/or the second housing 220. In some embodiments, the holes formed in the first housing 210 and/or the second housing 220 may be commonly used for the microphone 215 and the speakers 227 and 228. In some embodiments, the sound output devices 227 and 228 may include a speaker (e.g., piezo speaker) operating while excluding the holes formed in the first housing 210 and/or the second housing 220.

According to various embodiments, the camera modules 216a, 216b, and 225 may include a first camera device 216a disposed at the first surface 211 of the first housing 210, a second camera device 216b disposed at the second surface 212 of the first housing 210, and/or a third camera device 225 disposed at the fourth surface 222 of the second housing 220. According to an embodiment, the electronic device 101 may include a flash 218 disposed near the second camera device 216b. According to an embodiment, the flash 218 may include, for example, a light emitting diode or a xenon lamp. According to an embodiment, the camera devices 216a, 216b, and 225 may include one or more lenses, an image sensor, and/or an image signal processor. In some embodiments, at least one of the camera devices 216a, 216b, and 225 may include two or more lenses (wide angle and telephoto lenses) and image sensors and be disposed together at any one surface of the first housing 210 and/or the second housing 220.

According to various embodiments, the sensor modules 217a, 217b, and 226 may generate electrical signals or data values corresponding to an internal operating state of the electronic device 101 or an external environmental state. According to an embodiment, the sensor modules 217a, 217b, and 226 may include a first sensor module 217a disposed at the first surface 211 of the first housing 210, a second sensor module 217b disposed at the second surface 212 of the first housing 210, and/or a third sensor module 226 disposed at the fourth surface 222 of the second housing 220. In some embodiments, the sensor modules 217a, 217b, and 226 may include at least one of a gesture sensor, a grip sensor, a color sensor, an infrared (IR) sensor, an illumination sensor, an ultrasonic sensor, an iris recognition sensor, or a distance detection sensor (TOF sensor or RiDAR scanner).

According to various embodiments, the electronic device 101 may further include a sensor module (not illustrated), for example, at least one of a barometric pressure sensor, an angle sensor, a gyro sensor, a magnetic sensor, a biometric sensor, a temperature sensor, a humidity sensor, or a fingerprint recognition sensor. In some embodiments, the fingerprint recognition sensor may be disposed through at least one of the first side member 213 of the first housing 210 and/or the second side member 223 of the second housing 220.

According to various embodiments, the key input device 219 may be disposed to be exposed to the outside through the first side member 213 of the first housing 210. In some embodiments, the key input device 219 may be disposed to be exposed to the outside through the second side member 223 of the second housing 220. In some embodiment, the electronic device 101 may not include some or all of the above-described key input devices 219, and a key input device 219 that is not included may be implemented in other forms such as a soft key on at least one display 230 and 251. As another embodiment, the key input device 219 may be implemented using a pressure sensor included in at least one displays 230 and 251.

According to various embodiments, the connector port 229 may receive a connector (e.g., USB connector or interface connector port module (IF module)) for transmitting and receiving power and/or data to and from an external electronic device. In some embodiments, the connector port 229 may further include a separate connector port (e.g., ear jack hole) for performing together a function for transmitting and receiving an audio signal to and from an external electronic device or for performing a function for transmitting and receiving an audio signal.

According to various embodiments, at least one camera device 216a and 225 of the camera devices 216a, 216b, and 225, at least one sensor module 217a and 226 of the sensor modules 217a, 217b, and 226, and/or the indicator may be disposed to be visually exposed through the at least one display 230 and 251. For example, the at least one camera device 216a and 225, the at least one sensor module 217a and 226 and/or the indicator may be disposed under a display area of the displays 230 and 251 in an internal space of the at least one housing 210 and 220 and be disposed to contact the external environment through an opening perforated to the cover member (e.g., the second rear cover 250 and/or the window layer (not illustrated) of the first display 230). In another embodiment, some camera devices or sensor modules may be disposed to perform functions thereof without being visually exposed through a display.

Figure 3:
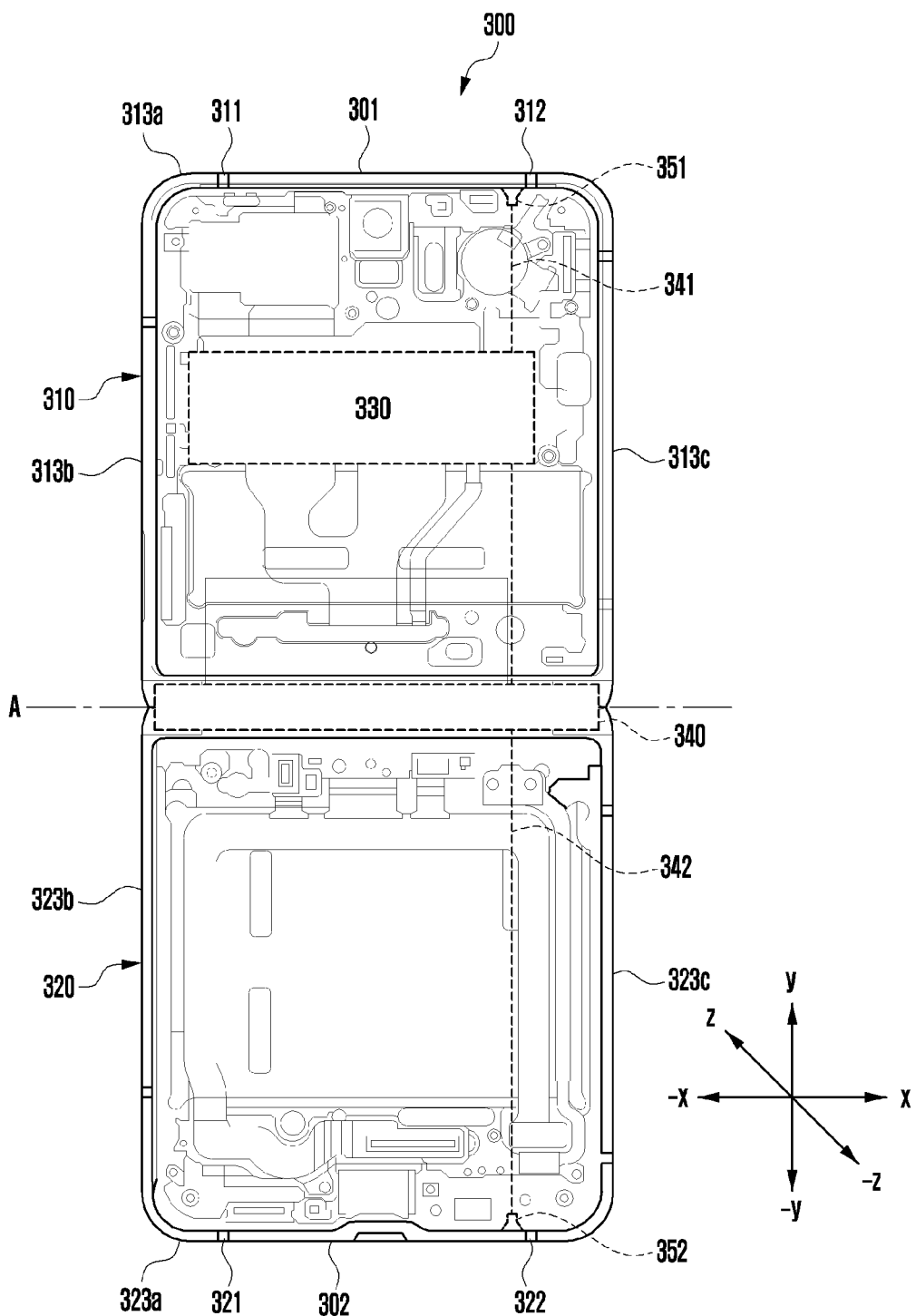
FIG. 3 is a plan view schematically illustrating a position of an antenna when an electronic device is in an unfolded state according to various embodiments of the disclosure.

FIG. 3 is a plan view schematically illustrating a position of an antenna when an electronic device is in an unfolded state according to various embodiments.

With reference to FIG. 3, an electronic device 300 according to various embodiments may include a first housing 310, a second housing 320, a first antenna 301, a second antenna 302, a printed circuit board 330, and a hinge module 340.

According to an embodiment, the first antenna 301 may be disposed at an end portion (e.g., an end portion in a +y direction) of the first housing 310, and the second antenna 302 may be disposed at an end portion (e.g., an end portion in a −y direction) of the second housing 320.

According to an embodiment, at least a portion of the first housing 310 may be coupled to the first side of the hinge module 340. The first housing 310 may include a first side surface 313a extending in an x direction, a second side surface 313b extended from one end of the first side surface 313a in the −y axis direction, and a third side surface 313c extended from the other end of the first side surface 313a in the −y-axis direction). The first housing 310 may be configured to be foldable with respect to the second housing 320 about the folding axis (A axis) of the hinge module 340.

According to an embodiment, at least a portion of the second housing 320 may be coupled to the second side of the hinge module 340. The second housing 320 may include a fourth side surface 323a, a fifth side surface 323b extended from one end of the fourth side surface 323a in the folding axis (A axis) direction (e.g., y axis direction), and a sixth side surface 323c extended from the other end of the fourth side surface 323a in the folding axis (A-axis) direction e.g., y-axis direction). The second housing 320 may be configured to be foldable and unfoldable with the first housing 310 about the folding axis (A axis) of the hinge module 340.

According to various embodiments, in an upper part of the first housing 310, the hinge module 340, and the second housing 320, a flexible display 230 (e.g., at least one display 230 of FIG. 2A or 2B) may be disposed to be foldable and/or unfoldable.

According to an embodiment, the hinge module 340 may be disposed between the first housing 310 and the second housing 320 and be configured so that the first housing 310 and the second housing 320 rotate. The hinge module 340 may be disposed such that the first housing 310 and the second housing 320 are in a folded state and/or an unfolded state with respect to the folding axis (A axis). The hinge module 340 may have a first side coupled to at least a portion of the first housing 310 and a second side coupled to at least a portion of the second housing 320.

According to an embodiment, the first antenna 301 may be disposed between a first segment 311 and a second segment 312 formed at the first side surface 313a of the first housing 310. The first antenna 301 may be electrically connected to a feeding controller (not illustrated) nd a processor (e.g., the processor 630 of FIG. 6) disposed in the printed circuit board 330. The first antenna 301 may transmit and receive a signal of a designated first frequency band.

According to various embodiments, the first antenna 301 may include a first feed point 351 integrally coupled therein. The first feed point 351 may be electrically connected to a first signal connection member 341 connected to the printed circuit board 330. For example, the first signal connection member 341 may include one of a coaxial cable, a flexible printed circuit board (FPCB), or an FPCB type RE cable (FRC).

According to an embodiment, the second antenna 302 may be disposed between a third segment 321 and a fourth segment 322 formed at the fourth side surface 323a of the second housing 320. The second antenna 302 may be electrically connected to a feeding controller (not illustrated) and a processor 630 disposed in the printed circuit board 330. The second antenna 302 may transmit and receive a signal of a designated second frequency band.

According to various embodiments, the second antenna 302 may include a second feed point 352 integrally coupled therein. The second feed point 352 may be electrically connected to a second signal connection member 342 connected to the printed circuit board 330. The second signal connection member 342 may include one of a coaxial cable, a flexible printed circuit board (FPCB), or an FPCB type RE cable (FRC).

According to various embodiments, the printed circuit board 330 may be electrically connected to the first feed point 351 of the first antenna 301 using the first signal connection member 341. The first feed point 351 may supply power to the first antenna 301.

According to various embodiments, the printed circuit board 330 may be electrically connected to the second feed point 352 of the second antenna 302 using the second signal connection member 342. The second teed point 352 may supply power to the second antenna 302.

According to an embodiment, the sensor module (e.g., a sensor module 620 of FIG. 6) may detect whether the first housing 310 and the second housing 320 are in an unfolding state or a folding state with respect to the hinge module 340 of the electronic device 300. The sensor module 620 may transfer a detection signal corresponding to the unfolded state or the folded state of the first housing 310 and the second housing 320 to the processor 630.

According to various embodiments, the sensor module 620 may detect a flip state of the electronic device 300. The sensor module 620 may detect an angle (e.g., rotation angle) corresponding to an unfolded state or a folded state of the first housing 310 and the second housing 320 based on the hinge module 340. The sensor module 620 may detect a tilt corresponding to an unfolded state or a folded state of the first housing 310 and the second housing 320.

According to various embodiments, the sensor module 620 may include one of an accelerometer sensor, a gyro sensor, a proximity sensor, a hall IC, or a 6-axis sensor for detecting an unfolded state or a folded state of the electronic device 300. The sensor module 620 may include the sensor module 176 illustrated in FIG. 1.

Figure 7:
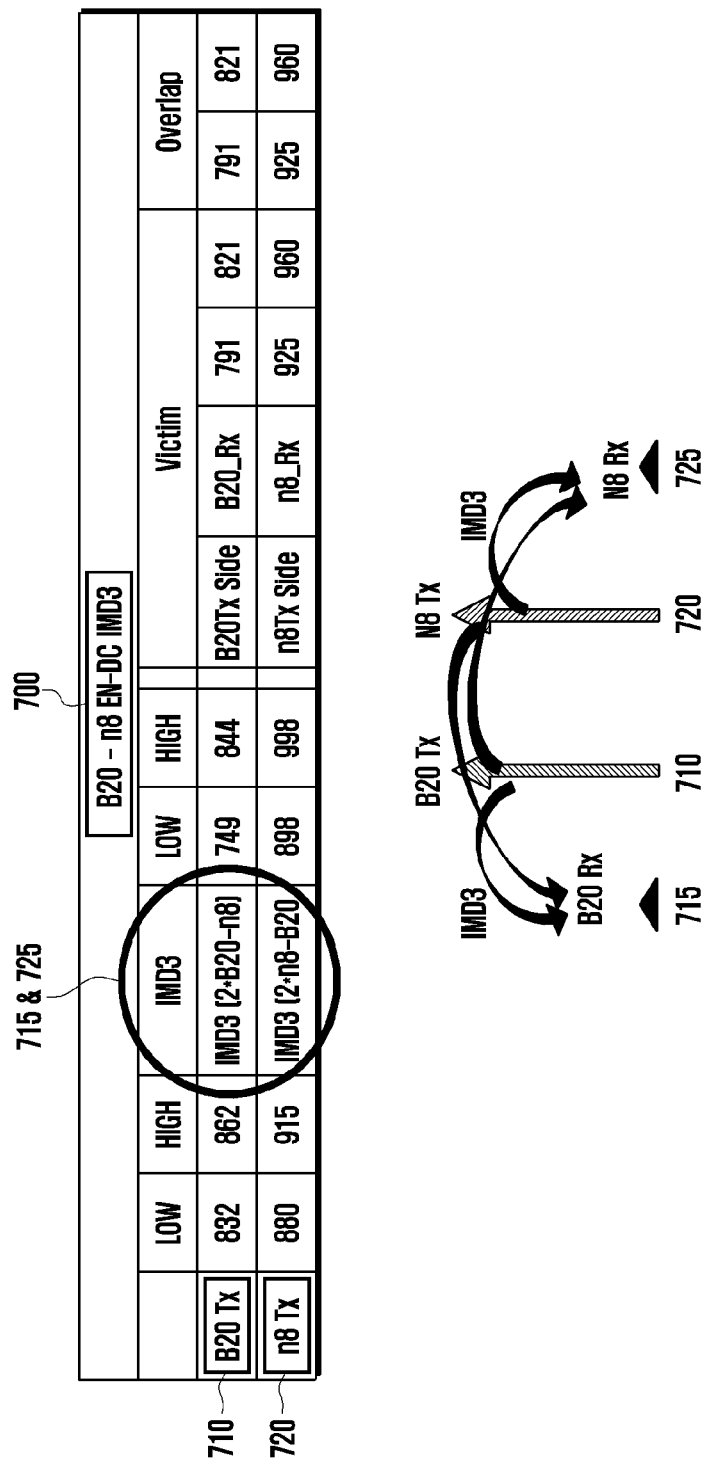
FIG. 7 illustrates a situation in which a structure of at least one antenna generates 3rd intermodulation distortion (IMD3) according to a comparative embodiment.

According to various embodiments, when the first housing 310 and the second housing 320 are in a folded state, the processor 630 may control a feeding controller (not illustrated) to control so that a first phase e.g., a first phase 701 of FIG. 7) of a current distributed to the first antenna 301 and a second phase (e.g., a second phase 702 of FIG. 7) of a current distributed to the second antenna 302 are the same. In this case, a current direction and a magnetic field direction of the first antenna 301 and the second antenna 302 are substantially equal; thus, the feeding efficiency and radiation efficiency of the first antenna 301 including a first conductive part 313a (corresponding to the first side surface) and the second antenna 302 including a second conductive part 323a (corresponding to the fourth side surface) may be improved.

According to various embodiments, the processor 630 may be electrically or operatively connected to the sensor module 620, a transceiver (not illustrated), and/or a feeding controller (not illustrated). The processor 630 may include the processor 120 illustrated in FIG. 1. The processor 630 may include a wireless communication module 192 illustrated in FIG. 1.

According to various embodiments, the processor 630 may control an overall operation between the electronic device 300 and a signal flow between internal components of the electronic device 300 and perform a data processing function of processing data. For example, the processor 630 may include a central processer (CPU), an application processor, and/or a communication processor. The processor 630 may include a single core processor or a multi-core processor.

According to various embodiments, a transceiver (not illustrated) may convert a radio signal (e.g., first reception signal) received from the first antenna 301 into digital data that may be processed (e.g., decoded) by the processor 630 to transfer the digital data to the processor 630. The transceiver (not illustrated) may convert a radio signal (e.g., second reception signal) received from the second antenna 302 into digital data that may be processed (e.g., decoded) by the processor 630 to transfer the digital data to the processor 630.

According to various embodiments, the transceiver (not illustrated) may transfer a radio signal (e.g., feed signal and/or transmission signal) to the first antenna 301 and the second antenna 302 in the form of electromagnetic waves including a carrier wave. The transceiver (not illustrated) may include an oscillator for generating a carrier wave and a modulation circuit for modulating the carrier wave.

According to various embodiments, the transceiver (not illustrated) may extract data from radio signals (e.g., first reception signal and second reception signal) received through the first antenna 301 and the second antenna 302 and transfer the extracted data to the processor 630. The transceiver (not illustrated) may include a demodulation circuit for demodulating radio signals (e.g., first reception signal and second reception signal) received from the first antenna 301 and the second antenna 302.

According to various embodiments, the processor 630 may control a transceiver (not illustrated) using a communication processor. The processor 630 may control an operation in which the transceiver (not illustrated) generates a radio signal (e.g., transmission signal). The processor 630 may determine a radio signal (e.g., first transmission signal and second transmission signal) to be radiated through the first antenna 301 and the second antenna 302 using the transceiver (not illustrated). The processor 630 may determine a phase and/or frequency of radio signals (e.g., first transmission signal and second transmission signal) for the first antenna 301 and the second antenna 302. The processor 630 may transfer a phase and/or frequency control signal determined for the first antenna 301 and/or the second antenna 302 to a feeding controller (not illustrated). The processor 630 may transfer a phase control signal for each of the first antenna 301 or the second antenna 302 to the feeding controller (not illustrated).

According to an embodiment, the first filter (not illustrated) may filter a radio signal (e.g., transmission signal) transferred from the first amplifier (not illustrated). The first filter (not illustrated) may filter a radio signal (e.g., transmission signal) transferred from the first amplifier (not illustrated) into a specific frequency band. The first filter (not illustrated) may filter a noise signal from a radio signal (e.g., transmission signal) transferred from the first amplifier (not illustrated), and transfer the filtered radio signal (e.g., transmission signal) to the feeding controller (not illustrated).

According to various embodiments, the feeding controller (not illustrated) may receive a radio signal (e.g., feed signal and/or transmission signal) amplified using a first amplifier (not illustrated) and filtered using a first filter (not illustrated). The feeding controller (not illustrated) may separate a radio signal (e.g., feed signal and/or transmission signal) and transfer the radio signal to the first antenna 301 and the second antenna 302. For example, the feeding controller (not illustrated) may transfer a first feed signal (e.g., first transmission signal) to the first antenna 301 through a first switch (not illustrated), the first signal connection member 341, and the first feed point 351. The feeding controller (not illustrated) may transfer a second feed signal (e.g., second transmission signal) to the second antenna 302 through a second switch (not illustrated), the second signal connection member 342, and the second feed point 352.

Figure 4:
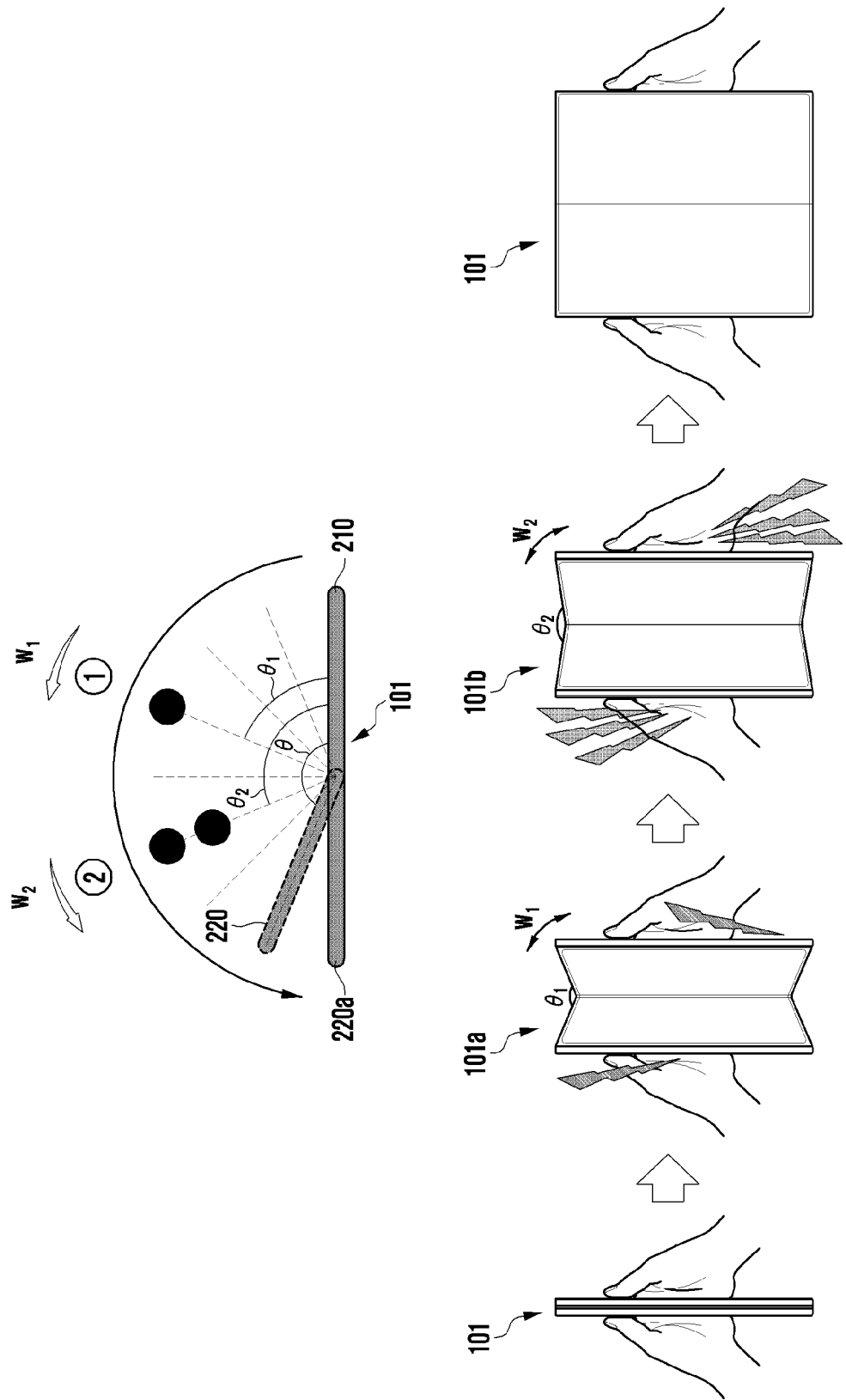
FIG. 4 is an exemplary diagram in which an electronic device controls transmission power of an antenna based on folding information according to various embodiments.

FIG. 4 is an exemplary diagram in which an electronic device controls transmission power of an antenna based on folding information according to various embodiments.

With reference to FIG. 4, the electronic device 101 may include a first housing 210 and a second housing 220 connected to each other to be folded or unfolded. According to various embodiments, the electronic device 101 may form a folding angle θ while being folded or unfolded. The folding angle θ may be understood as an angle formed between the first housing 210 and the second housing 220. The folding angle θ may be in a range of 0 degree to 180 degrees, depending on the state of the electronic device 101.

According to various embodiments, the electronic device 101 may identify a folding angle θ. According to an embodiment, the electronic device 101 may measure a folding angle θ during a folding or unfolding operation of the electronic device 101 through a sensor module (e.g., the sensor module 176 of FIG. 1). The electronic device 101 may measure a folding angle θ according to a predetermined period or may continuously measure a folding angle θ.

According to various embodiments, the electronic device 101 may detect a folding or unfolding operation. According to an embodiment, the electronic device 101 may detect a change in the folding angle θ and identify that a folding or unfolding operation is started based on the change in the folding angle θ.

According to various embodiments, the electronic device 101 may generate folding information. The folding information may be understood as information indicating a folded or unfolded state of the electronic device 101. According to an embodiment, the folding information may include at least a part of information on a folding angle θ and a folding angle section. The folding angle section may be understood as information on an angle section (i.e., angle range) to which the current folding angle θ belongs. According to an embodiment, the electronic device 101 may identify at least one of the folding angle θ or the folding angle section in real time and generate folding information on at least one of the folding angle θ or the folding angle section.

According to an embodiment, the electronic device 101 may differently control an antenna output in a state ① and an antenna output in a state ②. As the folding operation or the unfolding operation proceeds, that is, the state ① is changed to the state ② (i.e., unfolding operation) or the state ② is changed to the state ① (i.e., folding operation), the electronic device 101 may continuously change transmission power of the antenna. For example, when the state ① is changed to the state ②, the electronic device 101 may continuously increase transmission power of the antenna according to the folding angle θ. Conversely, when the state ② is changed to the state ①, the electronic device 101 may continuously decrease transmission power of the antenna according to the folding angle θ.

According to an embodiment, the electronic device 101 may store in advance a table regarding a change value of transmission power of an antenna corresponding to folding information. For example, the table stored in the electronic device 101 may be as follows.

TABLE 1

| Folding angle | First antenna TX back off (dB) | Second antenna TX back off (dB) |
| --- | --- | --- |
| 180 degrees (folder open) | 0 | 0 |
| 135 degrees | 1 | 1 |
| 90 degrees | 2 | 2 |
| 45 degrees | 3 | 3 |
| 0 degrees (folder close) | 4 | 4 |

The row of the table may mean state of each antenna, and the column thereof may mean an angle change of the electronic device 101.

According to an embodiment, at least one antenna (e.g., the first antenna 301 and the second antenna 302 of FIG. 3) may be disposed at each of an end portion of the first housing 310 and an end portion of the second housing 320.

According to an embodiment, when the electronic device 300 is in a folded state, both of the at least one antenna 301 and 302 may be disposed to face each other at an end portion of the first housing 310 and an end portion of the second housing 320.

According to an embodiment, when a folding angle θ of the electronic device 300 is 180 degrees (open state), an amount of power reduction of the first antenna 301 and the second antenna 302 may be 0 decibel (dB). When a folding angle θ of the electronic device 300 is 135 degrees (open state), an amount of power reduction of the first antenna 301 and the second antenna 302 may be 1 dB. When a folding angle θ of the electronic device 300 is 90 degrees (open state), an amount of power reduction of the first antenna 301 and the second antenna 302 may be 2 dB. When a folding angle θ of the electronic device 300 is 45 degrees (open state an amount of power reduction of the first antenna 301 and the second antenna 302 may be 3 dB.

In this embodiment, the folding angle θ of the electronic device 300 is measured in units of 45 degrees, but the invention is not limited thereto, and may vary according to a configuration at the time of producing the electronic device 300. Further, the amount of power reduction of the antenna may be determined through an experiment for each folding angle or may be determined according to a distance between a plurality of antennas. That is, the amount of power reduction in the table presented above is only an example, and detailed numerical values may be determined differently according to various facts such as a type and length of the antenna, a distance between a plurality of antennas, and transmission power.

Figure 5:
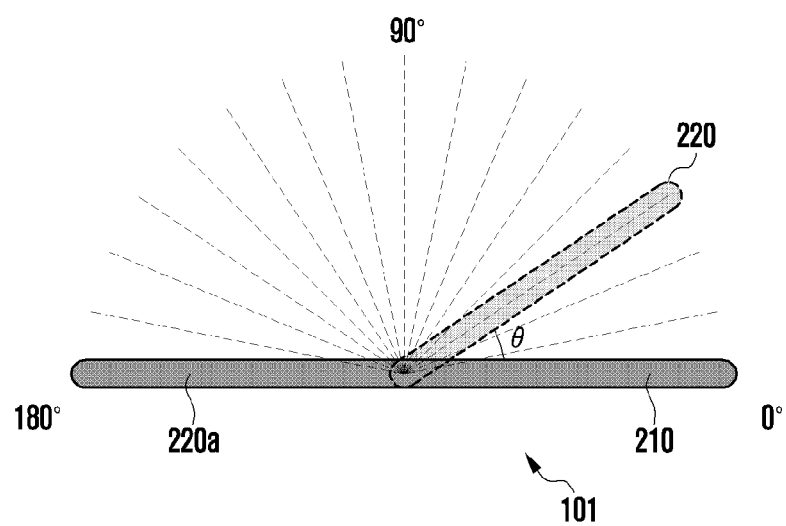
FIG. 5 illustrates a folding angle θ and a folding angle section of an electronic device 101 according to various embodiments.

FIG. 5 illustrates a folding angle θ and a folding angle section of an electronic device 101 according to various embodiments.

With reference to FIG. 5, the electronic device 101 may generate folding information. The folding information may be understood as information indicating a folded or unfolded state of the electronic device 101. The electronic device 101 may include a first housing 210 and a second housing 220 connected to the first housing 210 to be folded or unfolded. The electronic device 101 may form a folding angle θ between the first housing 210 and the second housing 220 while being folded or unfolded. According to an embodiment, the folding information may include at least a part of information on the folding angle θ or the folding angle section. The folding angle section may be understood as information on an angle section (i.e., angle range) to which the current folding angle θ belongs. According to an embodiment, the electronic device 101 may identify at least one of the folding angle θ or the folding angle section in real time and generate folding information on at least one of the folding angle θ or the folding angle section.

With reference to FIG. 5, the first housing 210 and the second housing 220 of the electronic device 101 may form a folding angle θ of 0 to 180 degrees (°) according to an unfolded or folded state. For example, the second housing 220 may be extended to a position 220a parallel to the first housing 210 based on a position of the first housing 210. As another example, the second housing 220 may rotate to form a folding angle θ of 0 to 360 degrees. According to an embodiment, the section of the folding angle θ may mean a section to which a current folding angle θ belongs among all sections (e.g., 0 degrees to 180 degrees) in which the folding angle θ of the electronic device 101 may be formed. For example, the folding angle section may include a plurality of pre-divided angle sections (i.e., angle ranges) among all angle sections (e.g., 0 degrees to 180 degrees). For example, all the angle sections may be divided into a first section (e.g., 0 degrees or more, but less than 45 degrees), a second section (45 degrees or more, but less than 90 degrees), and a third section (e.g., 90 degrees or more, but less than 135 degrees). Here, a section to which the current folding angle θ belongs may mean the folding angle section.

According to various embodiments, the electronic device 101 may generate folding information. According to an embodiment, the folding information may include at least a part of information on the folding angle θ or the folding angle section. According to an embodiment, the electronic device 101 may identify at least one of the folding angle θ or the folding angle section in real time and generate folding information on at least one of the folding angle θ or the folding angle section.

Figure 6:
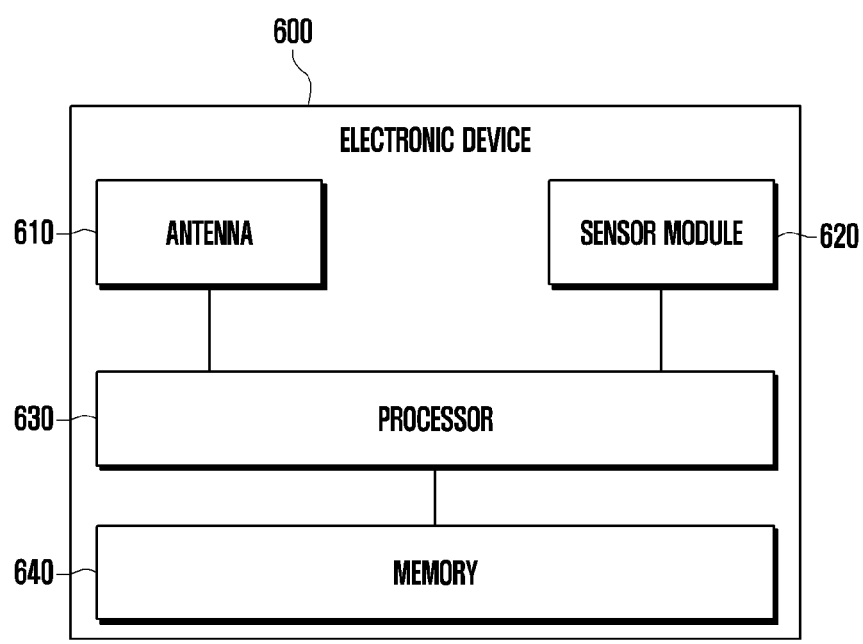
FIG. 6 is a block diagram illustrating an electronic device according to various embodiments.

FIG. 6 is a block diagram illustrating an electronic device according to various embodiments.

With reference to FIG. 6, an electronic device 600 may include at least one antenna 610, a sensor module 620, a processor 630, and a memory 640. The electronic device 600 may include at least a part of the configuration and/or functions of the electronic device 101 of FIGS. 1, 2A, and 2B or the electronic device 300 of FIG. 3. At least some of the respective components of the illustrated (or not illustrated) electronic device may be operatively, functionally, and/or electrically connected.

According to various embodiments, the antenna 610 may transmit and receive power and/or signals. A signal in which the antenna 610 may transmit or receive may be a short-range wireless communication (e.g., Bluetooth and/or WiFi) signal. According to an embodiment, the antenna 610 may transmit or receive a signal or power to or from the outside under the control of the communication module (e.g., the communication module 190 of FIG. 1) and/or the processor 630. Signals transmitted and received by the antenna 610 may include signals of various frequency bands (e.g., 2 GHz, 2.4 GHz, 5 GHz, and/or 6 GHz). The antenna 610 may perform communication by a standard according to IEEE 802.15.3.

According to various embodiments, the sensor module 620 may detect an operating state (e.g., power or temperature) of the electronic device 600 or an external environmental state (e.g., user state), and generate electrical signals or data values corresponding to the detected state. According to an embodiment, the sensor module 620 may include, for example, an angle sensor, a gyro sensor, a magnetic sensor, an acceleration sensor, a proximity sensor, or an illuminance sensor. According to an embodiment, the sensor module 620 may detect the folding angle θ of the electronic device 600.

According to various embodiments, the processor 630 is a configuration capable of performing arithmetic or data processing related to control and/or communication of each component of the electronic device 600, and may be configured with one or more processors. The processor 630 may include at least some of the configuration and/or functions of the processor 120 of FIG. 1.

According to various embodiments, there will be no limitation on the arithmetic and data processing functions that the processor 630 may implement in the electronic device 600, but hereinafter, features related to the control of a compressed file system in the memory 640 will be described in detail. Operations of the processor 630 may be performed by loading instructions stored in the memory 640.

According to various embodiments, the electronic device 600 may include at least one memory 640, and the memory 640 may include a main memory and storage. The main memory may be configured with a volatile memory such as a dynamic random access memory (DRAM), a static RAM (SRAM), or a synchronous dynamic RAM (SDRAM). The storage may include at least one of a one time programmable ROM (OTPROM), PROM, EPROM, EEPROM, mask ROM, flash ROM, flash memory, hard drive, or solid state drive (SSD). Alternatively, the memory 640 is a non-volatile memory and may include a large-capacity storage device. For example, the memory 640 may include at least one of a one-time programmable ROM (OTPROM), PROM, EPROM, EEPROM, mask ROM, flash ROM, flash memory, hard drive, or solid state drive (SSD). The memory 640 may store various file data, and the stored file data may be updated according to the operation of the processor 630.

According to various embodiments, the processor 630 may detect an unfolding or folding operation of a first housing and a second housing using the sensor module 620, and when the unfolding or folding operation is detected, the processor 630 may be configured to generate folding information on an unfolding operation or a folding operation based on a folding angle θ formed by the first housing (e.g., the first housing 210 of FIG. 2A) and the second housing (e.g., the second housing 220 of FIG. 2A) and to control the output of at least one antenna 610 based on the folding information.

According to an embodiment, the folding information may include at least one of a magnitude of a folding angle θ or an angle section to which the folding angle θ belongs. The folding angle θ may mean an angle formed between the first housing 210 and the second housing 220.

According to an embodiment, the memory 640 may store a table in which the degree of reduction (i.e., indication of amount of reduction) in an output of the antenna 610 according to the angle section to which the folding angle θ belongs is recorded.

According to an embodiment, the processor 630 may control to change the output of the antenna 610 according to a table.

According to an embodiment, as the folding angle θ approaches 0, when the electronic device 600 approaches a folded state, the processor 630 may control to cut off power of some of the plurality of antennas.

According to an embodiment, the processor 630 may identify reference signal received power (RSRP) of the electronic device 600, and when RSRP of the electronic device 600 is less than a first level, the processor 630 may control to cut off power of some of the plurality of antennas.

According to an embodiment, the processor may determine whether a structure of at least one antenna generates 3rd intermodulation distortion (IMD3). IMD3 will be described with reference to FIG. 7.

According to an embodiment, at least one antenna 610 may be disposed at an end portion of the first housing 210 and an end portion of the second housing 220.

According to an embodiment, when the electronic device 600 is in a folded state, the at least one antenna 610 may be disposed to face at an end portion of the first housing 210 and an end portion of the second housing 220.

FIG. 7 illustrates a situation in which a structure of at least one antenna generates 3rd intermodulation distortion (IMD3) according to a comparative embodiment.

IMD3 may mean a signal that may be generated according to an e-utra new radio dual connectivity (EN-DC) combination. EN-DC is a type of simultaneous use of resources of multiple base stations and may, for example, transmit and receive radio waves by simultaneously utilizing resources of an LTE base station in a 5G environment. When a first antenna of a 5G base station having a frequency f1 and a second antenna of an LTE base station having a frequency f2 operate simultaneously, IMD3 between signals may occur. The electronic device (e.g., the electronic device 600 of FIG. 6) may remove a distorted signal through a filtering process. However, because a frequency of a distorted signal IMD3 has a portion overlapped with that of the original signal bands f1 and f2, it may be difficult to remove the distorted signal IMD3 through filtering.

For example, when f1 has 890 MHz and f2 has 910 MHz, intermodulation-distorted signals having frequencies of 2f1-f2 and 2f2-f1 may be generated according to an intermodulation process. In this case, 2f1-f2 may have a value of 870 MHz, and 2f2-f1 may have a value of 930 MHz. This value is very close to the original signals f1 (890 MHz) and f2 (910 MHz), which may be difficult to remove the value by filtering. Further, the intermodulation-distorted signal overlaps the original signal bands f1 and f2, thereby reducing a performance of the antenna 610.

FIG. 7 illustrates such a situation, and it may be assumed that a first frequency 710 of a first antenna has a B20 band, and a second frequency 720 of a second antenna has an N8 band. In this case, IMD3 700 may occur while the first antenna and the second antenna operate simultaneously. The IMD3 700 may occur in an e-utra new radio dual connectivity (EN-DC) environment, as described above. In FIG. 7, the IMD3 700 may be generated by a combination of two frequencies (B20-N8) having different bands. IMD3 of the first frequency 710 and the second frequency 720 may be represented by IMD3, and may be represented by a third frequency 715 and a fourth frequency 725 in the drawing. IMD3 (e.g., the third frequency 715 and the fourth frequency 725) may be formed near the first frequency 710 and the second frequency 720, which are original signals; thus, it may be difficult to remove IMD3 using filtering.

Figure 8:
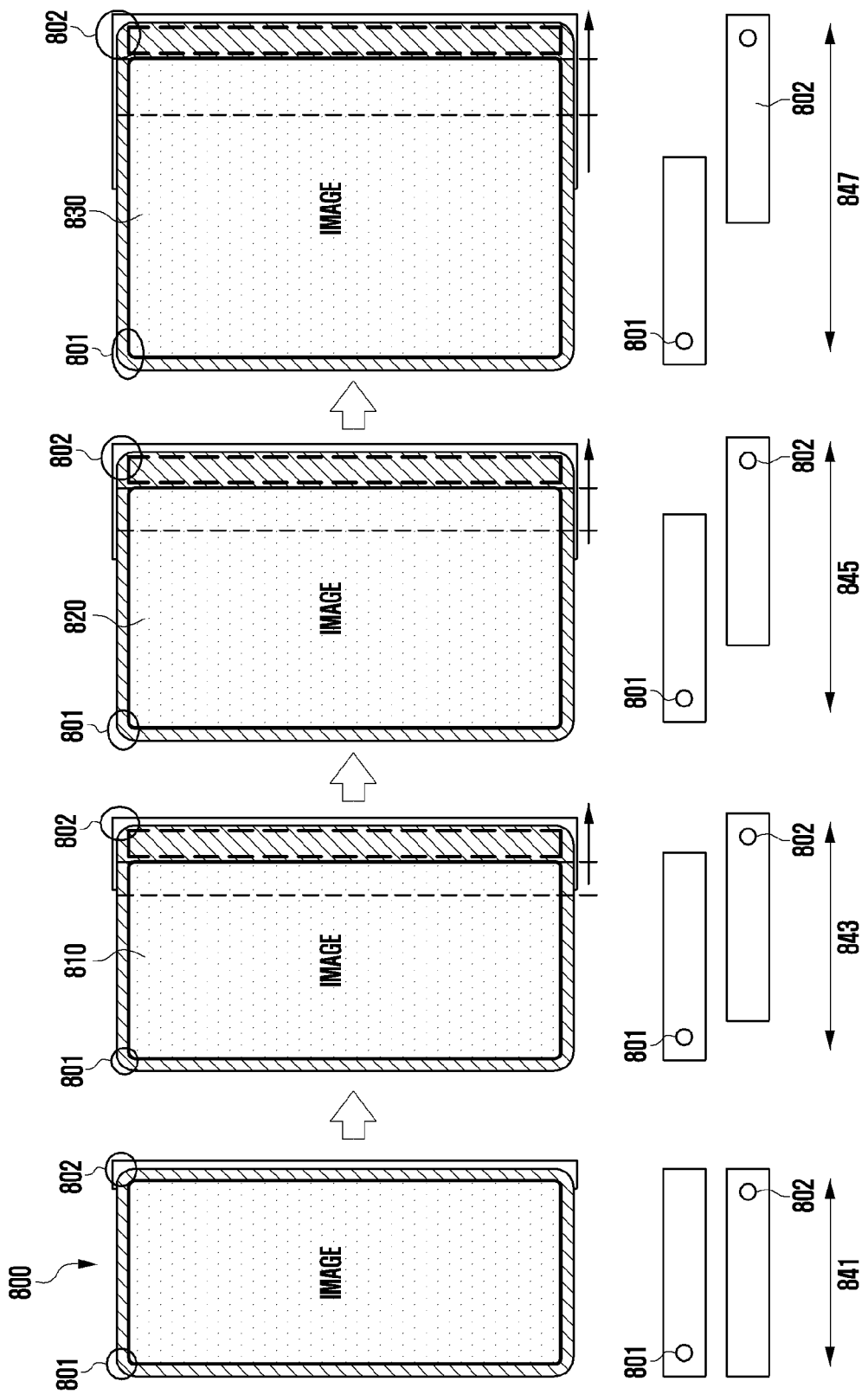
FIG. 8 illustrates a situation in which an electronic device controls an antenna output based on sliding information according to various embodiments.

FIG. 8 is a diagram illustrating a situation in which an electronic device controls an antenna output based on sliding information according to various embodiments.

According to an embodiment, an electronic device 800 may further include a slidable device or a rollable device other than a foldable device such as the electronic device 200 of FIGS. 2A and 2B or the electronic device 300 of FIG. 3. That is, the electronic device 800 may be equipped with an expandable display, such as a slidable or rollable display. The rollable display may be configured to wind around a roller disposed in a side (e.g., right side of the electronic device 800 in FIG. 8) of a housing structure in the electronic device 800 in a roll shape. The slidable device may expand a screen in a sliding manner. The rollable device may include a display of a form entirely woundable inside the rollable device without a folding shaft.

According to an embodiment, the electronic device 800 may be expanded through processes 810, 820, and 830. Further, the electronic device 800 may be reduced through processes 830, 820, and 810. A distance between a first antenna 801 and a second antenna 802 in the electronic device 800 may vary according to whether the electronic device 800 is expanded or reduced.

In an embodiment, for example, when the electronic device 800 is in an unextended state (i.e., reduced state), a distance between the first antenna 801 and the second antenna 802 may form a first length 841. Thereafter, when the electronic device 800 is extended through the processes 810, 820, and 830, the distances between the first antenna 801 and the second antenna 802 may increase to a fourth length 847 through a second length 843 and a third length 845. Further, when the electronic device 800 is reduced through a sequence of the processes 830, 820, and 810, the distance between the first antenna 801 and the second antenna 802 may decrease to the second length 843 through the fourth length 847 and the third length 845. Here, the first length 841 is smaller than the second length 843, the second length 843 is smaller than the third length 845, and the third length 845 is smaller than the fourth length 847.

According to an embodiment, the electronic device 800 may adjust an output intensity of at least one of the first antenna 801 or the second antenna 802 based on the distance between the first antenna 801 and the second antenna 802. For example, when the electronic device 800 is in the reduced state, the distance between the first antenna 801 and the second antenna 802 may be relatively close (i.e., first length 841). In this case, because the distance between the first antenna 801 and the second antenna 802 is close, mutual interference may occur relatively large. In order to prevent the mutual interference, the electronic device 800 may reduce the output intensity of at least one of the first antenna 801 or the second antenna 802. Conversely, when the electronic device 800 is extended, the distance between the first antenna 801 and the second antenna 802 may be relatively long (i.e., fourth length 847). In this case, because the distance between the first antenna 801 and the second antenna 802 is long, the mutual interference may occur relatively less. In this state, in order to improve a performance of the antenna, the electronic device 800 may increase the output intensity of at least one of the first antenna 801 or the second antenna 802.

Figure 9:
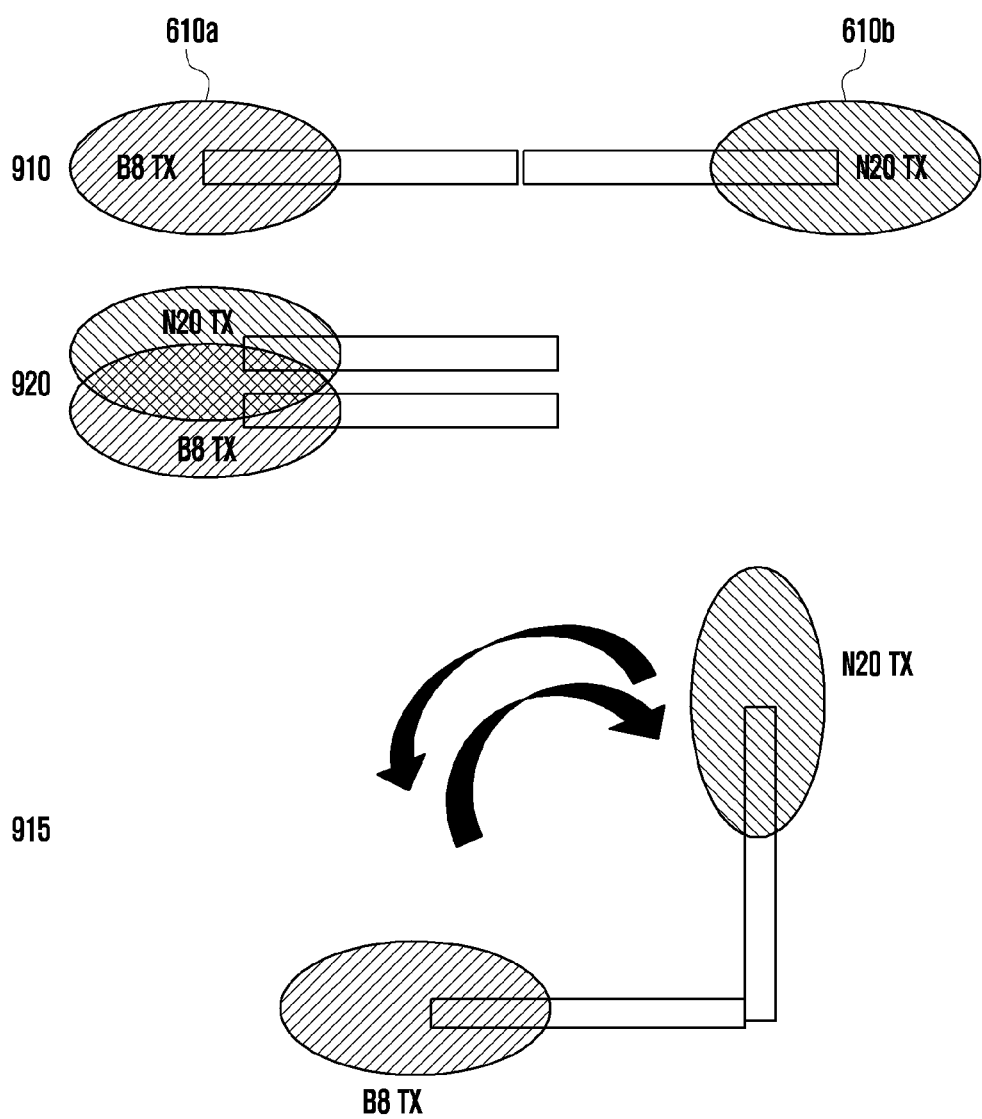
FIG. 9 illustrates a situation in which IMD3 occurs during a folding operation of an electronic device according to various embodiments.

FIG. 9 illustrates a situation in which 3rd intermodulation interference (IMD3) occurs during a folding operation of an electronic device according to various embodiments.

Reference numeral 910 illustrates a situation in which a folding angle θ of the electronic device the electronic device 600 of FIG. 6) is 180 degrees. This may be understood as a situation in which the foldable device is open. In this case, because the antennas 610a and 610b existing at opposite ends of the electronic device 600 are far apart from each other, mutual interference thereof may be relatively minimized.

Reference numeral 920 illustrates a situation in which the folding angle θ of the electronic device 600 is 0 degrees. This may be understood as a situation in which the foldable device is closed or folded, in this case, because the antennas 610a and 610b existing at opposite ends of the electronic device 600 are close to each other, mutual interference thereof may be relatively large.

Reference numeral 915 illustrates a situation in which the folding angle θ of the electronic device 600 is 90 degrees. In this case, mutual interference between the antennas 610a and 610b existing at opposite ends of the electronic device 600 may become relatively large or small according to the folding angle θ. For example, when the folding angle θ of the electronic device 600 increases, the antennas 610a and 610b existing at opposite ends of the electronic device 600 become farther apart from each other, as in the situation of reference numeral 910, so that mutual interference thereof may be relatively minimized. Conversely, when the folding angle θ of the electronic device 600 decreases, the antennas 610a and 610b existing at opposite ends of the electronic device 600 become closer to each other, as in the situation of reference numeral 920, so that mutual interference thereof may be relatively large.

When an unfolding operation or a folding operation is detected, the electronic device 600 according to various embodiments may generate folding information on an unfolding operation or a folding operation based on a folding angle θ formed by the first housing 210 and the second housing 220 and control an output of at least one antenna 610a and 610b based on the folding information.

According to various embodiments, an electronic device includes a housing structure, a sensor module; and a processor operatively connected to the sensor module. The housing structure includes a plurality of antennas; a hinge; a first housing connected to the hinge and including a first surface and a second surface disposed opposite to the first surface; and a second housing connected to the hinge and including a third surface and a fourth surface disposed opposite to the third surface, where in a folded state, the first surface faces the third surface, and in an unfolded state, the first surface and the third surface face in the same direction. The processor detects an unfolding operation or a folding operation between a first housing nd a second housing using the sensor module, generates folding information on the unfolding operation or the folding operation based on a folding angle formed between the first housing and the second housing, when the unfolding operation or the folding operation is detected, and controls an output of at least one antenna of the plurality of antennas based on the folding information.

According to an embodiment, the folding information may further include information on an angle section to which the folding angle belongs.

According to an embodiment, the electronic device may further include a memory, wherein the memory may store a table of the degree of reduction in the output of the at least one of the plurality of antennas according to an angle section to which the folding angle belongs.

According to an embodiment, the processor may control to change the output of the at least one of the plurality of antennas according to the table.

According to an embodiment, as the folding angle approaches 0, when the electronic device approaches the folded state, the processor may control to cut off power of the at least one of the plurality of antennas.

According to an embodiment, the processor may identify reference signal received power (RSRP) of the electronic device, and control to cut off power of he at least one of the plurality of antennas when RSRP of the electronic device is less than first level.

According to an embodiment, the folding information may include a direction in which the folding angle changes, and the processor may determine whether the electronic device is in the unfolded state or the folded state based on a direction in which the folding angle changes.

According to an embodiment, the processor may determine whether a structure of the at least one of the plurality of antennas generates IMD3.

According to an embodiment, the at least one of the plurality of antennas includes a first antenna and a second antenna, the first antenna may be disposed at an end portion of the first housing and the second antenna may be disposed at an end portion of the second housing, and when the electronic device is in a folded state, the first antenna and the second antenna may be disposed to face each other.

According to various embodiments, an electronic device includes a housing structure, wherein the housing structure may include a plurality of antennas; a rollable display configured to wind around a roller disposed in a side of the housing structure in a roll shape; a sensor module; and a processor operatively connected to the sensor module, where the processor detects an expansion operation or a reduction operation of the rollable display using the sensor module, measures a distance between the plurality of antennas when an expansion operation or a reduction operation of the rollable display is detected, and controls an output of at least one antenna of the plurality of antennas based on the distance between the plurality of antennas.

Figure 10:
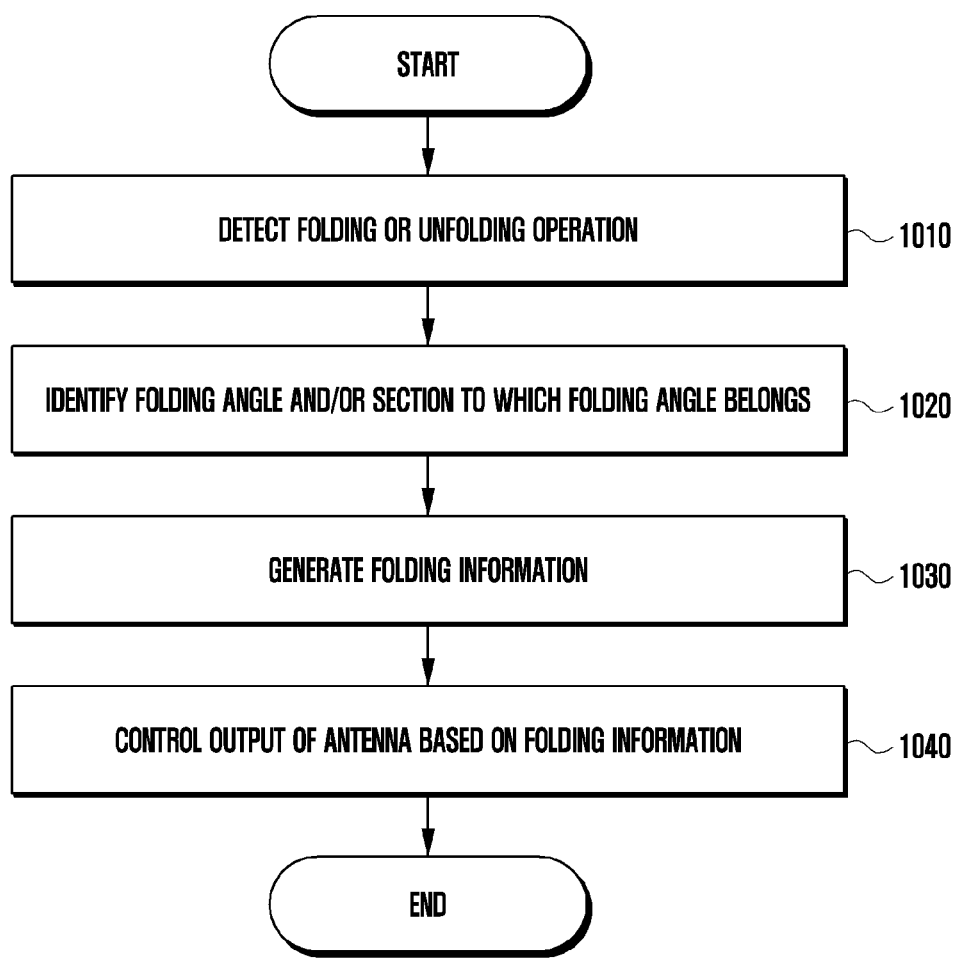
FIG. 10 is a flowchart illustrating an operation in which an electronic device controls an antenna output based on folding information according to various embodiments.

FIG. 10 is a flowchart illustrating an operation in which an electronic device controls an antenna output based on folding information according to various embodiments.

With reference to FIG. 10, an operation in which the electronic device (e.g., the electronic device 600 of FIG. 6) controls the output of the antenna (e.g., the antenna 610 of FIG. 6) based on the folding information may be understood as a series of operations performed by the processor (e.g., the processor 630 of FIG. 6) of the electronic device 600. All or part of each operation of FIG. 10 may be changed and/or substituted with another operation, or the order of each operation may be changed.

With reference to operation 1010, the processor 630 may detect a folding or unfolding operation. According to an embodiment, the processor 630 may detect a change in a folding angle θ of the electronic device 600. According to an embodiment, in order to control an output of the antenna 610 according to the folding angle θ, the processor 630 may detect a folding or unfolding operation of the electronic device 600. The processor 630 may detect a folding angle θ using a sensor module (e.g., the sensor module 620 of FIG. 6), and identify that a folding or unfolding operation is started based on a change in the folding angle θ.

With reference to operation 1020, the processor 630 may identify a folding angle (e.g., the folding angle θ of FIG. 4) of the electronic device 600. The folding angle θ may be understood as an angle formed between the first housing (e.g., the first housing 210 of FIG. 2A) and the second housing (e.g., the second housing 220 of FIG. 2A). According to an embodiment, the processor 630 may measure a folding angle θ during the folding or unfolding operation of the electronic device 600 through the sensor module 620. The processor 630 may measure the folding angle θ according to a predetermined period or may continuously measure the folding angle θ.

With reference to operation 1030, the processor 630 may generate folding information. The folding information may be understood as information indicating a folded or unfolded state of the electronic device 600. According to an embodiment, the folding information may include at least a part of information on the folding angle θ or the folding angle section. The folding angle section may be understood as information on an angle section to which the current folding angle θ belongs. According to an embodiment, the processor 630 may identify at least one of the folding angle θ or the folding angle section in real time, and generate folding information on at least one of the folding angle θ or the folding angle section.

With reference to operation 1040, the processor 630 may control an output of the antenna 610 based on the folding information. As the folding angle θ approaches 0 (e.g., less than 10 degrees, more preferably less than 5 degrees), that is, when the electronic device 600 approaches a folded state, the processor 630 may control to cut off power of some of the plurality of antennas 610a and 610b. According to an embodiment, the processor 630 may store, in the memory 640, a table of the degree of reduction (i.e., indication of amount of reduction) in an output of the antenna 610 according to the angle section to which the folding angle θ belongs. The processor 630 may control to change the output of the antenna 610 according to the table.

Figure 11:
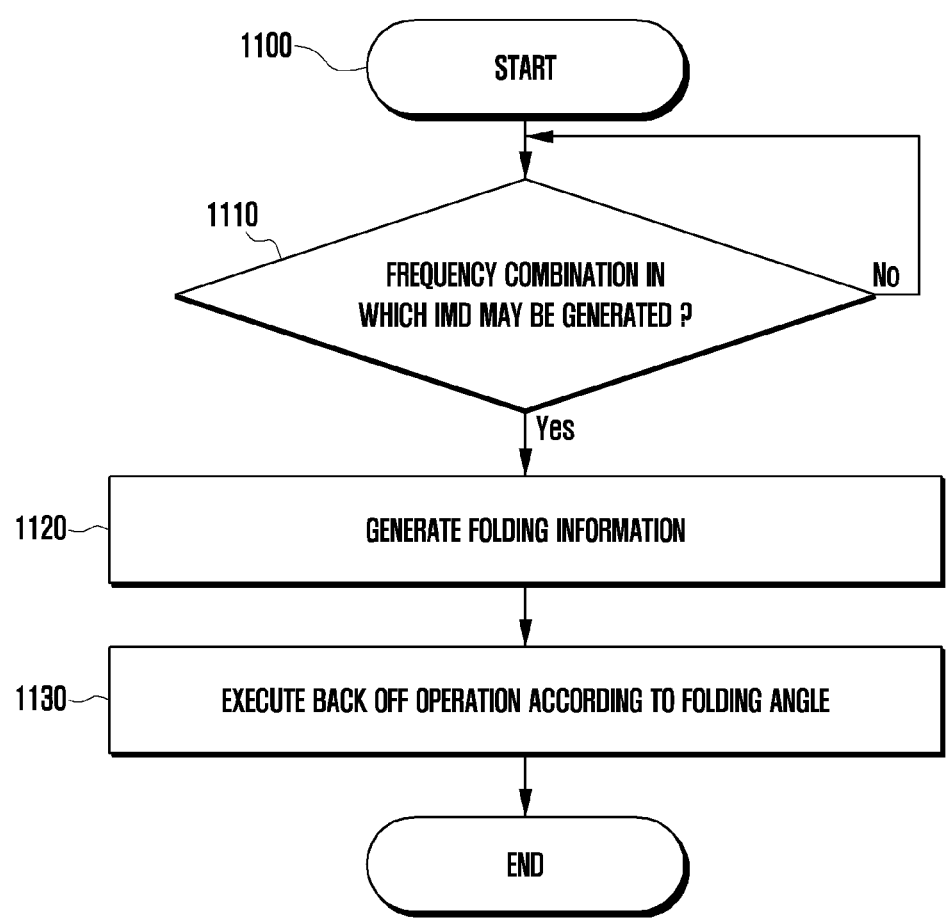
FIGS. 11 to 13 are flowcharts illustrating an antenna output control method of an electronic device according to various embodiments.
Figure 12:
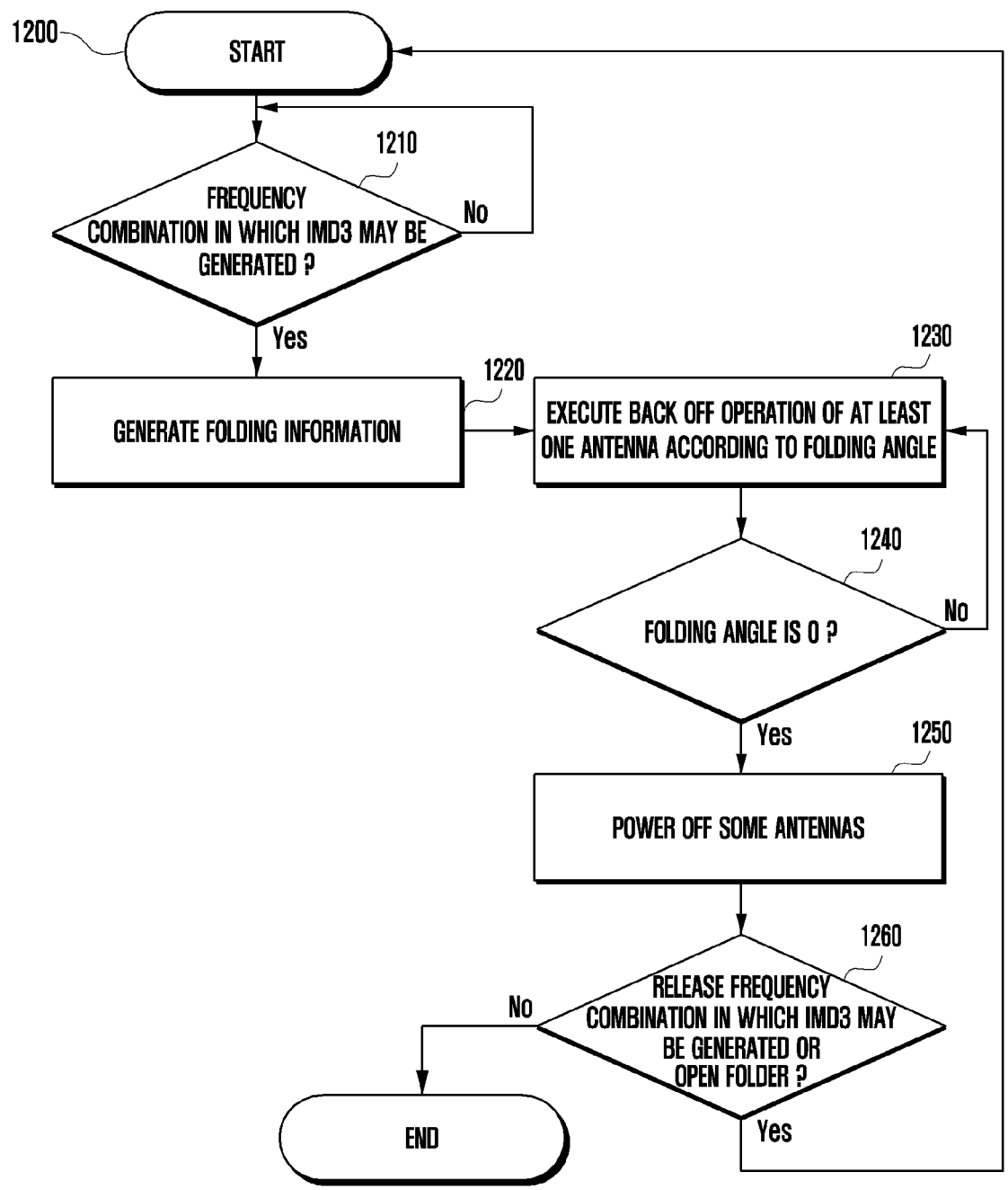
Figure 13:
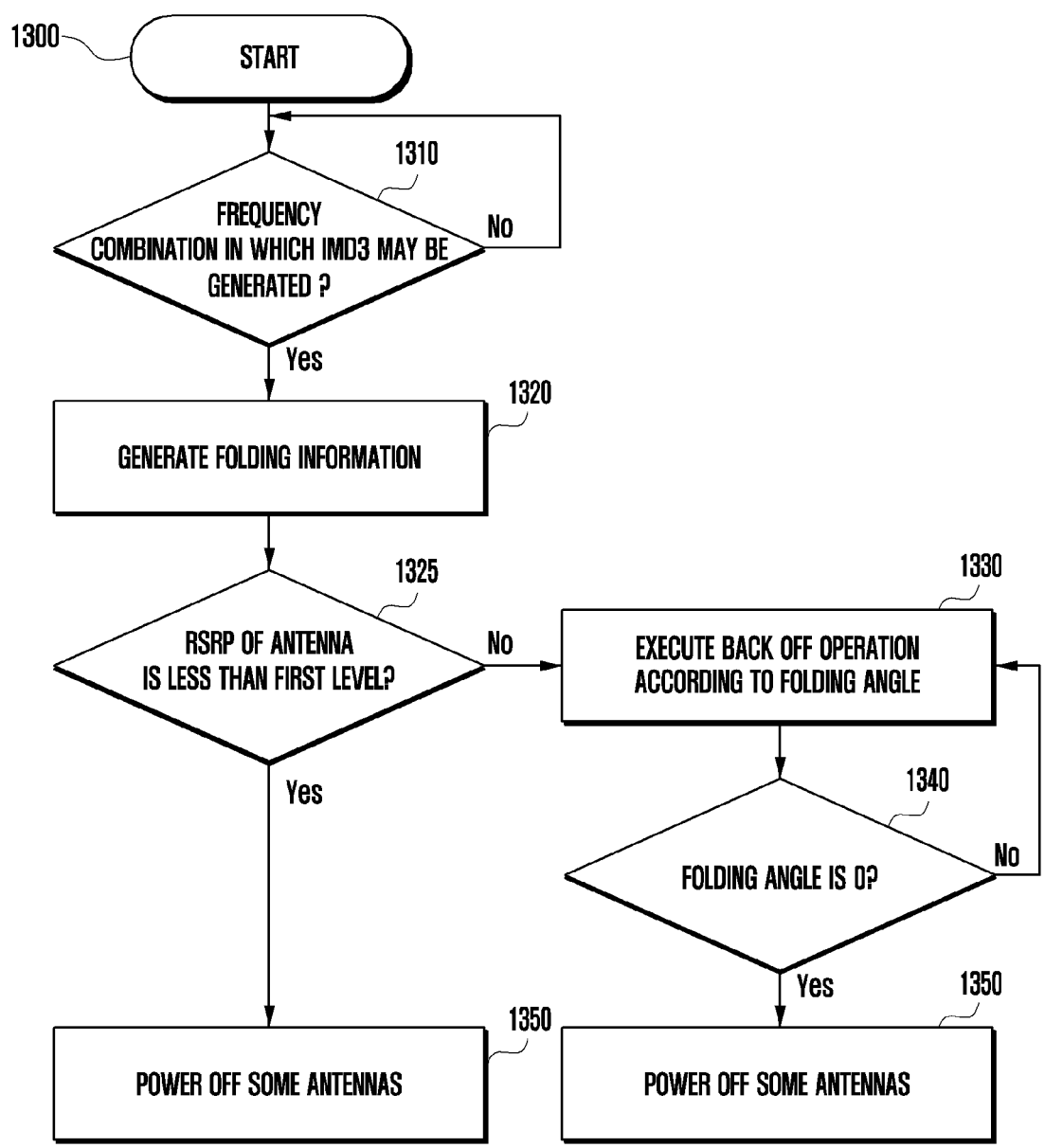

FIGS. 11 to 13 are flowcharts illustrating an antenna output control method of an electronic device according to various embodiments.

FIGS. 11 to 13 are diagrams illustrating antenna output control methods 1100, 1200, and 1300 of an electronic device (e.g., the electronic device 600 of FIG. 6) according to an embodiment. Operations described with reference to FIGS. 11 to 13 may be implemented based on instructions that may be stored in a computer recording medium or a memory (e.g., the memory 640 of FIG. 6).

The illustrated methods 1100, 1200, and 1300 may be executed by the electronic device (e.g., the electronic device 600 of FIG. 6) described above with reference to FIGS. 1 to 9, and the technical features described above will be omitted hereinafter.

In operation 1110, the processor (e.g., the processor 630 of FIG. 6) may determine whether a combination of antennas (e.g., the antenna 610 of FIG. 6) in the electronic device 600 may generate IMD3. IMD3 may mean a signal that may be generated according to e-utra new radio dual connectivity (EN-DC) combination, EN-DC is a type of simultaneous use of resources of multiple base stations and may, for example, transmit and receive radio waves by simultaneously utilizing resources of an LTE base station in a 5G environment. When a first antenna of a 5G base station having a frequency f1 and a second antenna of an LTE base station having a frequency f2 operate simultaneously, IMD3 may occur in the signal. When the distorted signal is different from the original frequencies f1 and f2, the distorted signal may be removed through a filtering process. However, because a frequency of IMD3 has a portion overlapped with the original signal bands f1 and f2, it may b difficult to remove IMD3 through filtering. IMD3 has been previously described with reference to FIG. 7.

When a frequency combination of the antenna corresponds to a combination (e.g., B20-N8) capable of generating IMD3, the processor 630 may generate folding information in operation 1120. The folding information may be understood as information indicating a folded or unfolded state of the electronic device 600. According to an embodiment, the folding information may include at least a part of information on the folding angle θ and the folding angle section. The folding angle section may be understood as information on an angle section to which the current folding angle θ belongs. According to an embodiment, the processor 630 may identify at least one of the folding angle θ or the folding angle section in real time, and generate folding information on at least one of the folding angle θ or the folding angle section.

Thereafter, in operation 1130, the processor 630 may control (e.g., back off) the output of the antenna 610 based on the folding information. According to an embodiment, the processor 630 may store, in the memory 640, a table in which the degree of reduction (i.e., indication of amount of reduction) in the output of the antenna 610 according to the angle section to which the folding angle θ belongs is recorded. The processor 630 may control to change the output of the antenna 610 according to the table.

In operation 1210, the processor (e.g., the processor 630 of FIG. 6) may determine whether a combination of antennas (e.g., the antenna 610 of FIG. 6) in the electronic device 600 may generate IMD3. This is the same as operation 1110 of FIG. 11.

When the frequency combination of the antenna corresponds to a combination (e.g., B20-N8) capable of generating IMD3, the processor 630 may generate folding information in operation 1220. The folding information may be understood as information indicating a folded or unfolded state of the electronic device 600. According to an embodiment, the folding information may include at least a part of information on the folding angle θ and the folding angle section. The folding angle section may be understood as information on the angle section to which the current folding angle θ belongs. According to an embodiment, the processor 630 may identify at least one of the folding angle θ or the folding angle section in real time, and generate folding information on at least one of the folding angle θ or the folding angle section.

Thereafter, in operation 1230, the processor 630 may control (e.g., back off) the output of the antenna 610 based on folding information. According to an embodiment, the processor 630 may store, in the memory 640, a table of the degree of reduction (i.e., indication of amount of reduction) in the output of the antenna 610 according to the angle section to which the folding angle θ belongs. The processor 630 may control to change the output of the antenna 610 according to the table.

In operation 1240, the processor 630 may identify whether the folding angle θ is 0 degrees. In operation 1250, as the folding angle θ approaches 0 (e.g., less than 10 degrees, more preferably less than 5 degrees), that is, when the electronic device 600 approaches a folded state, the processor 630 may control to cut off power of some of the plurality of antennas 610a and 610b.

Thereafter, in operation 1260, in a situation in which the frequency combination (e.g., B20-N8) in which IMD3 may be generated is released or the electronic device 600 opens as the folding angle θ exceeds 0 degrees and approaches 180 degrees more than 170 degrees, more preferably more than 175 degrees), the processor 630 may identify whether a frequency combination in which IMD3 may be generated is formed in the antenna 610 by returning to the start again.

In operation 1310, the processor (e.g., the processor 630 of FIG. 6) may determine whether a combination of antennas (e.g., the antenna 610 of FIG. 6) in the electronic device 600 may generate IMD3. This is the same as operation 1110 of FIG. 11.

When the frequency combination of the antenna corresponds to a combination (e.g., B20-N8) capable of generating IMD3, the processor 630 may generate folding information in operation 1320. The folding information may be understood as information indicating a folded or unfolded state of the electronic device 600. According to an embodiment, the folding information may include at least a part of information on the folding angle θ and the folding angle section. The folding angle section may be understood as information on an angle section to which the current folding angle θ belongs. According to an embodiment, the processor 630 may identify at least one of the folding angle θ or the folding angle section in real time, and generate folding information on at least one of the folding angle θ or folding angle section.

In operation 1325, the processor 630 may determine whether RSRP of the antenna 610 is less than a first level. RSRP of the antenna 610 is a value obtained by measuring the signal level and quality in the antenna network, and when RSRP is less than a predetermined level, it may be classified as a weak electric field. When RSRP in the antenna 610 of the electronic device 600 is a weak electric field, the processor 630 may have difficulty in controlling the output through back off of the output of some antennas 610. Therefore, when RSRP of the antenna 610 is less than a first level, the processor 630 may cut off the output of some antennas in addition to output control through output reduction (back off) of the antenna 610 in operation 1350.

If RSRP of the antenna 610 is not less than a first level, in operation 1330, the processor 630 may control back off) the output of the antenna 610 based on the folding information. According to an embodiment, the processor 630 may store, in the memory 640, a table of the degree of reduction (i.e., indication of amount of reduction) in the output of the antenna 610 according to an angle section to which the folding angle θ belongs. The processor 630 may control to change the output of the antenna 610 according to the table.

In operation 1340, the processor 630 may identify whether the folding angle θ is 0 degrees. As the folding angle θ approaches 0 (e.g., less than 10 degrees, more preferably less than 5 degrees), that is, when the electronic device 600 approaches a folded state, in operation 1350, the processor 630 may control to cut off power of some of the plurality of antennas 610a and 610b.

Figure 14:
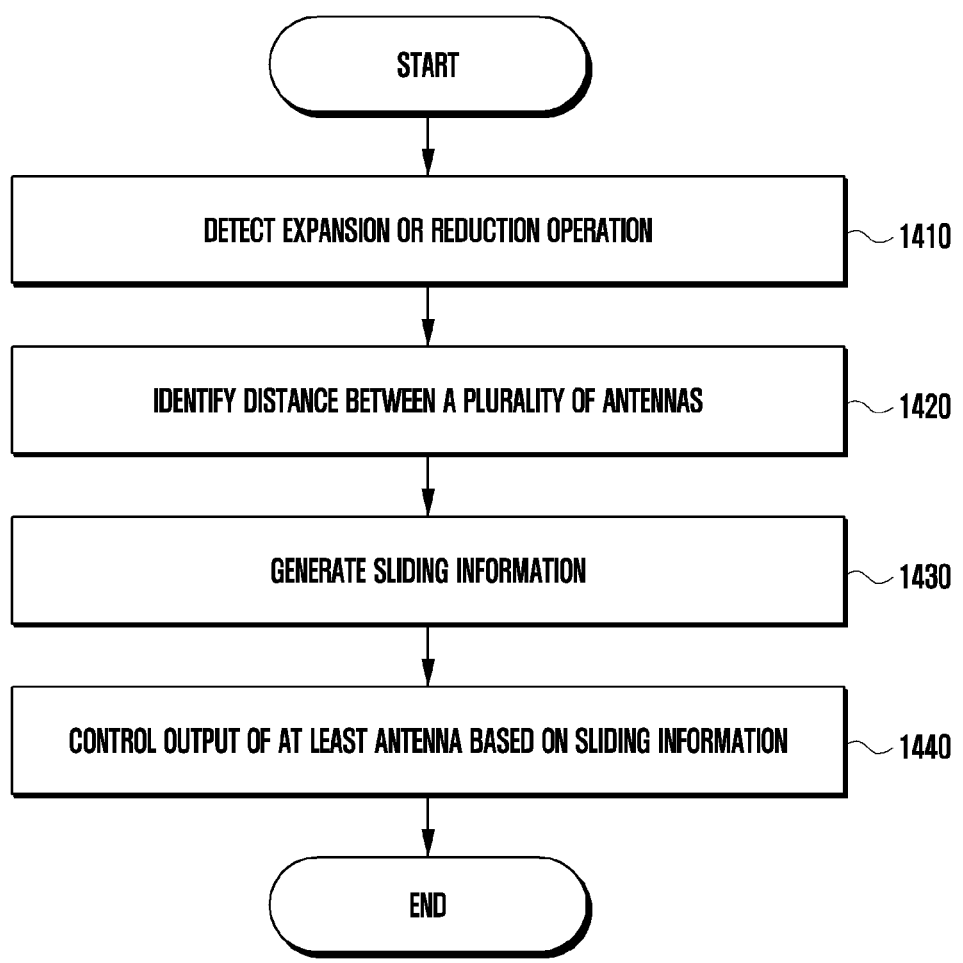
FIG. 14 is a flowchart illustrating an operation in which an electronic device controls an antenna output based on sliding information according to various embodiments.

FIG. 14 is a flowchart illustrating an operation in which an electronic device controls an antenna output based on sliding information according to various embodiments.

With reference to HG. 14, an operation in which the electronic device (e.g., the electronic device 600 of FIG. 6) controls an output of the antenna (e.g., the antenna 610 of FIG. 6) based on the folding information may be understood as a series of operations performed by the processor (e.g., the processor 630 of FIG. 6) of the electronic device 600. All or part of each operation of FIG. 14 may be changed and/or replaced with other operations, or the order of each operation may be changed.

With reference to operation 1410, the processor 630 may detect an expansion or reduction operation (hereinafter, a sliding operation) of the display. According to an embodiment, in order to control the output of the antenna 610 based on the distance between the plurality of antennas (e.g., the first antenna 801 and the second antenna 802 of FIG. 8), the processor 630 may detect an expansion or reduction operation of the display of the electronic device 600. The processor 630 may detect the degree of expansion (i.e., indication of amount of expansion) of the display using a sensor module (e.g., the sensor module 620 of FIG. 6).

With reference to operation 1420, the processor 630 may identify a distance between a plurality of antennas (e.g., the first antenna 801 and the second antenna 802 of FIG. 8) of the electronic device 600. According to an embodiment, the processor 630 may measure a distance between antennas during an expansion or reduction operation of the display in the electronic device 600 using the sensor module 620. The processor 630 may measure a distance between the antennas according to a predetermined period or may continuously measure a distance between the antennas.

With reference to operation 1430, the processor 630 may generate sliding information. The sliding information may be understood as information indicating an expanded or reduced state of the display in the electronic device 600. According to an embodiment, the processor 630 may identify a distance between a plurality of antennas in real time and generate sliding information.

With reference to operation 1440, the processor 630 may control the output of the antenna 610 based on the sliding information. When the display in the electronic device 600 approaches the reduced state, the processor 630 may control to cut off power of some of the plurality of antennas (e.g., the first antenna 801 and the second antenna 802 of FIG. 8). According to an embodiment, the processor 630 may store, in the memory 640, a table of the degree of decrease in an output of the antenna 610 based on the distance between the plurality of antennas (e.g., the first antenna 801 and the second antenna 802 of FIG. 8). The processor 630 may control to change the output of the antenna 610 according to the table.

Figure 15:
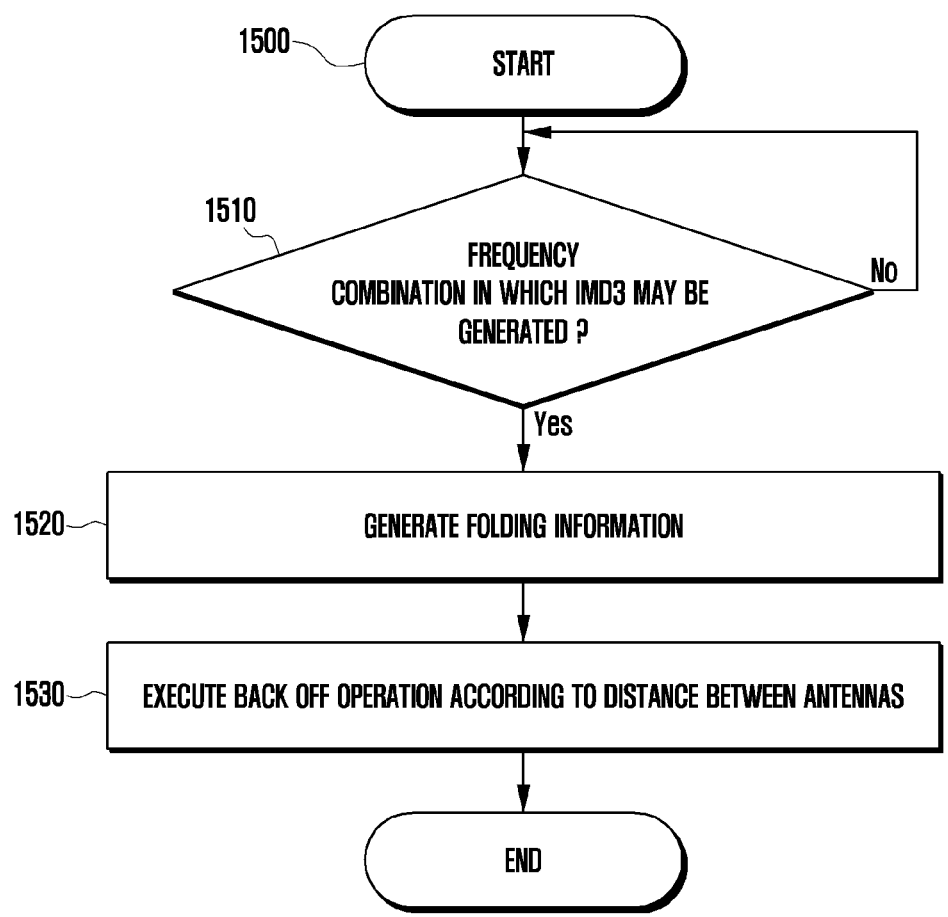
FIGS. 15 to 17 are flowcharts illustrating an antenna output control method of an electronic device according to various embodiments.
Figure 16:
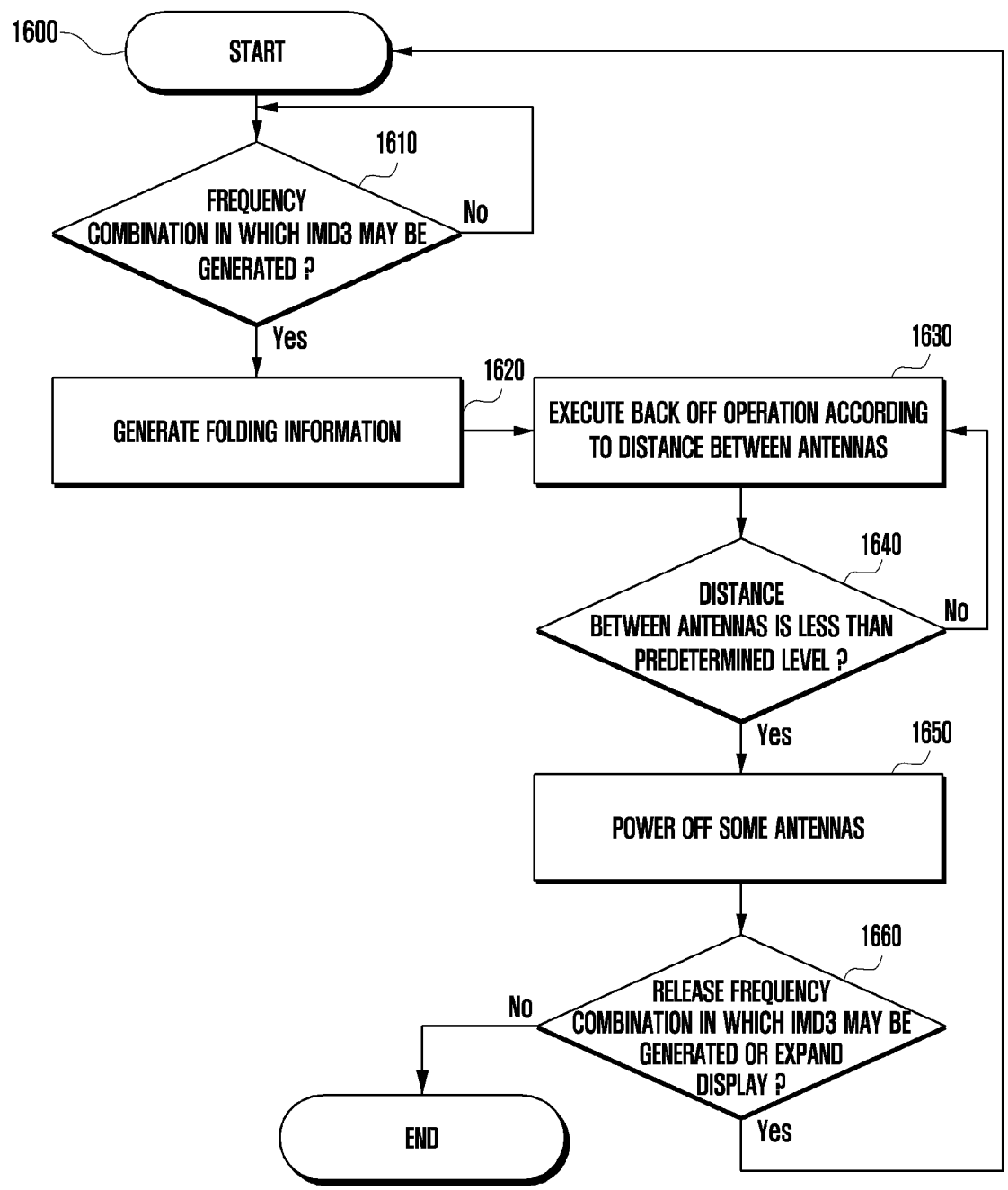
Figure 17:
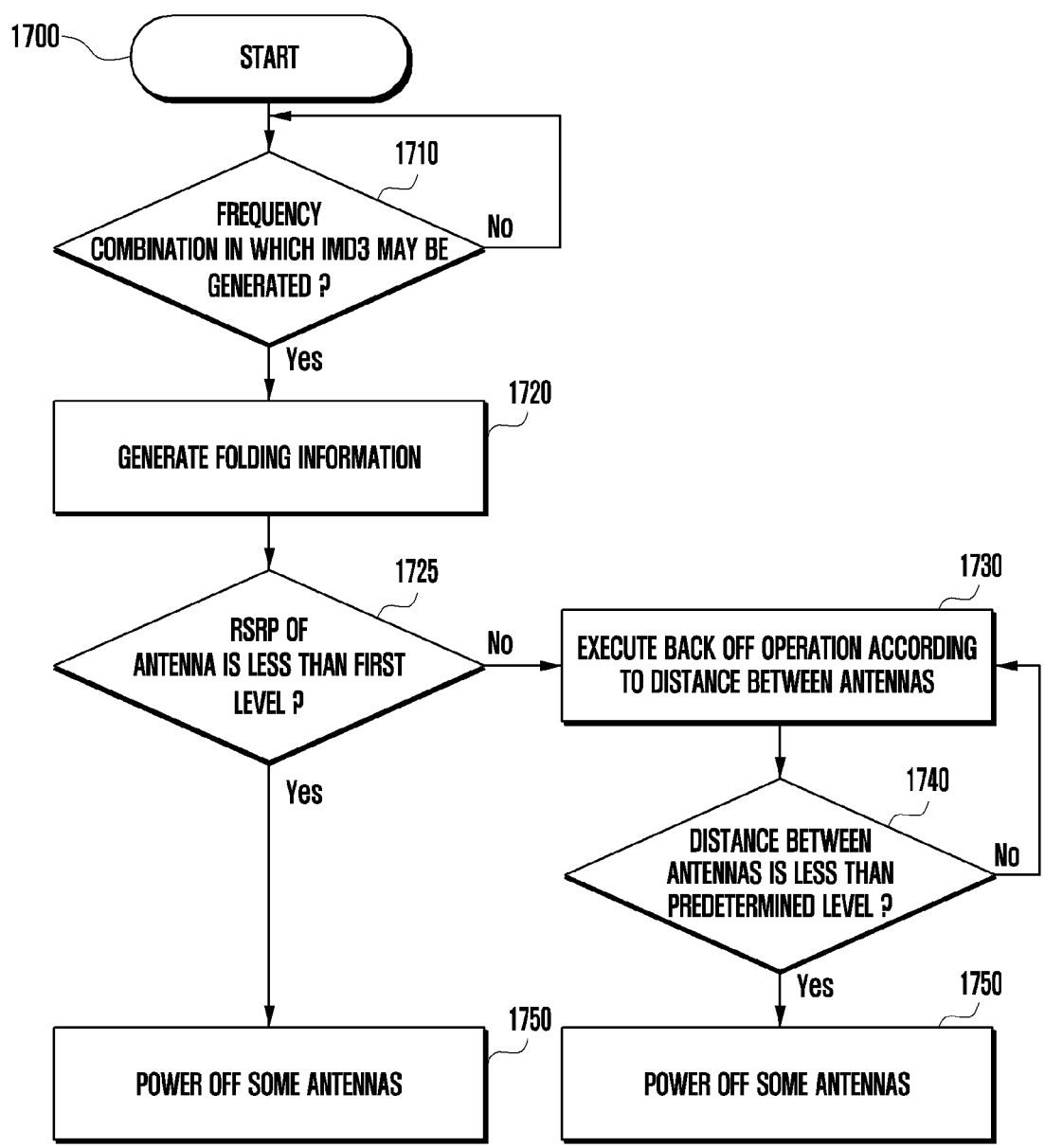

FIGS. 15 to 17 are flowcharts illustrating an antenna output control method of an electronic device according to various embodiments.

FIGS. 15 to 17 are diagrams illustrating methods 1500, 1600, and 1700 of controlling an antenna output of an electronic device (e.g., the electronic device 600 of FIG. 6) according to an embodiment. Operations described with reference to FIGS. 15 to 17 may be implemented based on instructions that may be stored in a computer recording medium or a memory (e.g., the memory 640 of FIG. 6).

The illustrated methods 1500, 1600, and 1700 may be executed by the electronic device (e.g., the electronic device 600 of FIG. 6) described above with reference to FIGS. 1 to 9, and the technical features described above will be omitted hereinafter.

In operation 1510, the processor (e.g., the processor 630 of FIG. 6) may determine whether a combination of antennas (e.g., the antenna 610 of FIG. 6) in the electronic device 600 may generate IMD3. IMD3 may mean a signal that may be generated according to EN-DC combination. EN-DC is a type of simultaneous use of resources of multiple base stations and may, for example, transmit and receive radio waves by simultaneously utilizing resources of an LTE base station in a 5G environment. When a first antenna of a 5G base station having a frequency f1 and a second antenna of an LTE base station having a frequency f2 operate simultaneously, IMD3 may occur in the signal. When the distorted signal is different from the original frequencies f1 and f2, the distorted signal may be removed through a filtering process. However, because a frequency of IMD3 has a portion overlapped with the original signal bands f1 and 12, it may be difficult to remove IMD3 through filtering. IMD3 has been previously described with reference to FIG. 7.

When the frequency combination of the antenna corresponds to a combination (e.g., B20-N8) capable of generating IMD3, the processor 630 may generate sliding information in operation 1520. The sliding information may be understood as information indicating an expanded or reduced state of the display in the electronic device 600. According to an embodiment, the processor 630 may identify a distance between a plurality of antennas in real time and generate sliding information.

Thereafter, in operation 1530, the processor 630 may control (e.g., back off) the output of the antenna 610 based on the sliding information. According to an embodiment, the processor 630 may store, in the memory 640, a table of the degree of decrease in output of the antenna 610 based on a distance between the plurality of antennas (e.g., the first antenna 801 and the second antenna 802 of FIG. 8). The processor 630 may control to change the output of the antenna 610 according to the table.

In operation 1610, the processor (e.g., the processor 630 of FIG. 6) may determine whether a combination of antennas (e.g., the antenna 610 of FIG. 6) in the electronic device 600 may generate IMD3. This is the same as operation 1510 of FIG. 15.

When the frequency combination of the antenna corresponds to a combination (e.g., B20-N8) capable of generating IMD3, the processor 630 may generate sliding information in operation 1620. The sliding information may be understood as information indicating an expanded or reduced state of the display in the electronic device 600. According to an embodiment, the processor 630 may identify a distance between a plurality of antennas in real time and generate sliding information.

Thereafter, in operation 1630, the processor 630 may control (e.g., back off) the output of the antenna 610 based on the sliding information. According to an embodiment, the processor 630 may store, in the memory 640, a table of the degree of decrease in an output of the antenna 610 based on the distance between the plurality of antennas (e.g., the first antenna 801 and the second antenna 802 of FIG. 8). The processor 630 may control to change the output of the antenna 610 according to the table.

In operation 1640, the processor 630 may identify whether the distance between the plurality of antennas 801 and 802 in the electronic device 600 is less than a predetermined level. In operation 1650, as the distance between the plurality of antennas the first antenna 801 and the second antenna 802 of FIG. 8) approaches 0, that is, when the display in the electronic device 600 approaches a reduced state, the processor 630 may control to cut off power of some of the plurality of antennas (e.g., the first antenna 801 and the second antenna 802 of FIG. 8).

Thereafter, in operation 1660, when the frequency combination (e.g., B20-N8) in which IMD3 may be generated is released or the display in the electronic device 600 is expanded, the processor 630 may identify whether a frequency combination in which IMD3 may be generated is formed in the antenna 610 by returning to the start again.

In operation 1710, the processor (e.g., the processor 630 of FIG. 6) may determine whether the combination of antennas (e.g., the antenna 610 of FIG. 6) in the electronic device 600 may generate IMD3. This is the same as operation 1510 of FIG. 15.

When the frequency combination of the antenna corresponds to a combination (e.g., B20-N8) capable of generating IMD3, the processor 630 may generate sliding information in operation 1720. The sliding information may be understood as information indicating an expanded or reduced state of the display in the electronic device 600. According to an embodiment, the processor 630 may identify a distance between a plurality of antennas in real time and generate sliding information.

In operation 1725, the processor 630 may determine whether RSRP of the antenna 610 is less than a first level. RSRP of the antenna 610 is a value obtained by measuring a signal level and quality in the antenna network, and when RSRP s less than a predetermined level, it may be classified as a weak electric field. When RSRP in the antenna 610 of the electronic device 600 is a weak electric field, the processor 630 may have difficulty in controlling the output through back off of the output of some antennas 610. Therefore, when RSRP of the antenna 610 is less than a first level, the processor 630 may cut off the output of some antennas in addition to output control through output reduction (back off) of the antenna 610 in operation 1750.

If RSRP of the antenna 610 is not less than a first level, in operation 1730, the processor 630 may control (e.g., back off) an output of at least one of the plurality of antennas (e.g., the first antenna 801 and the second antenna 802 of FIG. 8) based on the distance between the plurality of antennas (e.g., the first antenna 801 and the second antenna 802 of FIG. 8). According to an embodiment, the processor 630 may store, in the memory 640, a table of the degree of decrease in an output of the antenna 610 based on the distance between the plurality of antennas (e.g., the first antenna 801 and the second antenna 802 of FIG. 8). The processor 630 may control to change the output of the antenna 610 according to the table.

In operation 1740, the processor 630 may identify whether the distance between the plurality of antennas 801 and 802 is less than a predetermined level. When the distance between the plurality of antennas 801 and 802 is less than a predetermined level, the processor 630 may control to cut off power of some of the plurality of antennas (e.g., the first antenna 801 and the second antenna 802 of FIG. 8) in operation 1750.

The embodiments of this document disclosed in this specification and drawings only present a specific example in order to easily describe the technical contents according to an embodiment of this document and to help an understanding of the embodiments of this document, and they do not intend to limit the scope of the embodiments of this document. Accordingly, all changes or modifications derived from the technical idea of various embodiments of this document in addition to the embodiments described herein should be construed as being included in the scope of various embodiments of this document.

According to various embodiments, a method of controlling an antenna output of an electronic device may include detecting an unfolding operation or a folding operation between a first housing and a second housing; generating folding information on the unfolding operation or the folding operation based on a folding angle formed between the first housing and the second housing when the unfolding operation or the folding operations detected; measuring a distance between the plurality of antennas; and controlling an output of at least one antenna of the plurality of antennas based on the folding information or based on the distance between the plurality of antennas.

According to an embodiment, the folding information may include information on at least one of a magnitude of the folding angle or an angle section to which the folding angle belongs.

According to an embodiment, the method of controlling an antenna output of an electronic device may further include storing a table in which the degree of decrease in an output of the at least one antenna according to an angle section to which the folding angle belongs is recorded.

According to an embodiment, controlling the output of the at least one antenna based on the folding information a further include changing the output of the at least one antenna according to the table.

According to an embodiment, controlling the output of at least one antenna based on the folding information may further include controlling to cut off power of the at least one antenna when the electronic device approaches a folded state as the folding angle approaches 0 (e.g., less than 10 degrees, more preferably less than 5 degrees).

According to an embodiment, the method of controlling an antenna output of an electronic device may further include identifying RSRP of the electronic device; and controlling to cut off the power of at least one antenna when RSRP of the electronic device s than a first level.

According to an embodiment, the folding information may include a direction in which the folding angle changes, and generating folding information on the unfolding operation or the folding operation based on a folding angle formed between the first housing and the second housing may further include determining whether the electronic device is in an unfolded state or a folded state based on the direction in which the folding angle changes.

According to an embodiment, the method of controlling an antenna output of an electronic device may further include determining whether the structure of the at least one antenna generates IMD3.

According to an embodiment, the plurality of antennas may include a first antenna and a second antenna, the first antenna may be disposed at an end portion of the first housing and the second antenna may be disposed at an end portion of the second housing.

According to an embodiment, when the electronic device is in a folded state, the first antenna and the second antenna may be disposed to face each other.

The invention claimed is:

1. An electronic device, comprising:
   a housing structure,
      wherein the housing structure comprises:
         a plurality of antennas;
         a hinge;
         a first housing connected to the hinge and comprising a first surface and a second surface disposed opposite the first surface; and
         a second housing connected to the hinge and comprising a third surface and a fourth surface disposed opposite the third surface,
   a sensor module for detecting a value related to a relative position between the first housing and the second housing;
   a memory storing information on an output of at least one of the plurality of antennas according to the relative position between the first housing and the second housing; and
   a processor operatively connected to the sensor module,
   wherein in a folded state, the first surface faces the third surface, and in an unfolded state, the first surface and the third surface face in a same direction,
   wherein the processor is configured to:
   identify the relative position between the first housing and the second housing based on the value detected by the sensing module,
   and
   control the output of the at least one of the plurality of antennas based on the information stored in the memory and the identified relative position.

2. The electronic device of claim 1, wherein the processor is configured to control to cut off power of the at least one of the plurality of antennas when the electronic device approaches the folded state.

3. The electronic device of claim 1, wherein the processor is configured to:
   identify reference signal received power (RSRP) of the electronic device, and
   control to cut off power of the at least one of the plurality of antennas when RSRP of the electronic device is less than a first level.

4. The electronic device of claim 1,
   wherein the processor is configured to determine whether the electronic device is in the unfolded state or the folded state based on the direction in which the relative position changes.

5. The electronic device of claim 1, wherein the processor is configured to determine whether a structure of the at least one of the plurality of antennas generates 3rd intermodulation distortion (IMD3).

6. The electronic device of claim 1, wherein the at least one of the plurality of antennas includes a first antenna and a second antenna,
   the first antenna is disposed at an end portion of the first housing and the second antenna is disposed at an end portion of the second housing, and
   the first antenna and the second antenna are disposed to face each other when the electronic device is in the folded state.

* * * * *